INVENTOR.
FRANCIS J. DOHRER
BY
Cook and Schermerhorn
ATTORNEYS

INVENTOR.
FRANCIS J. DOHRER
BY
ATTORNEYS

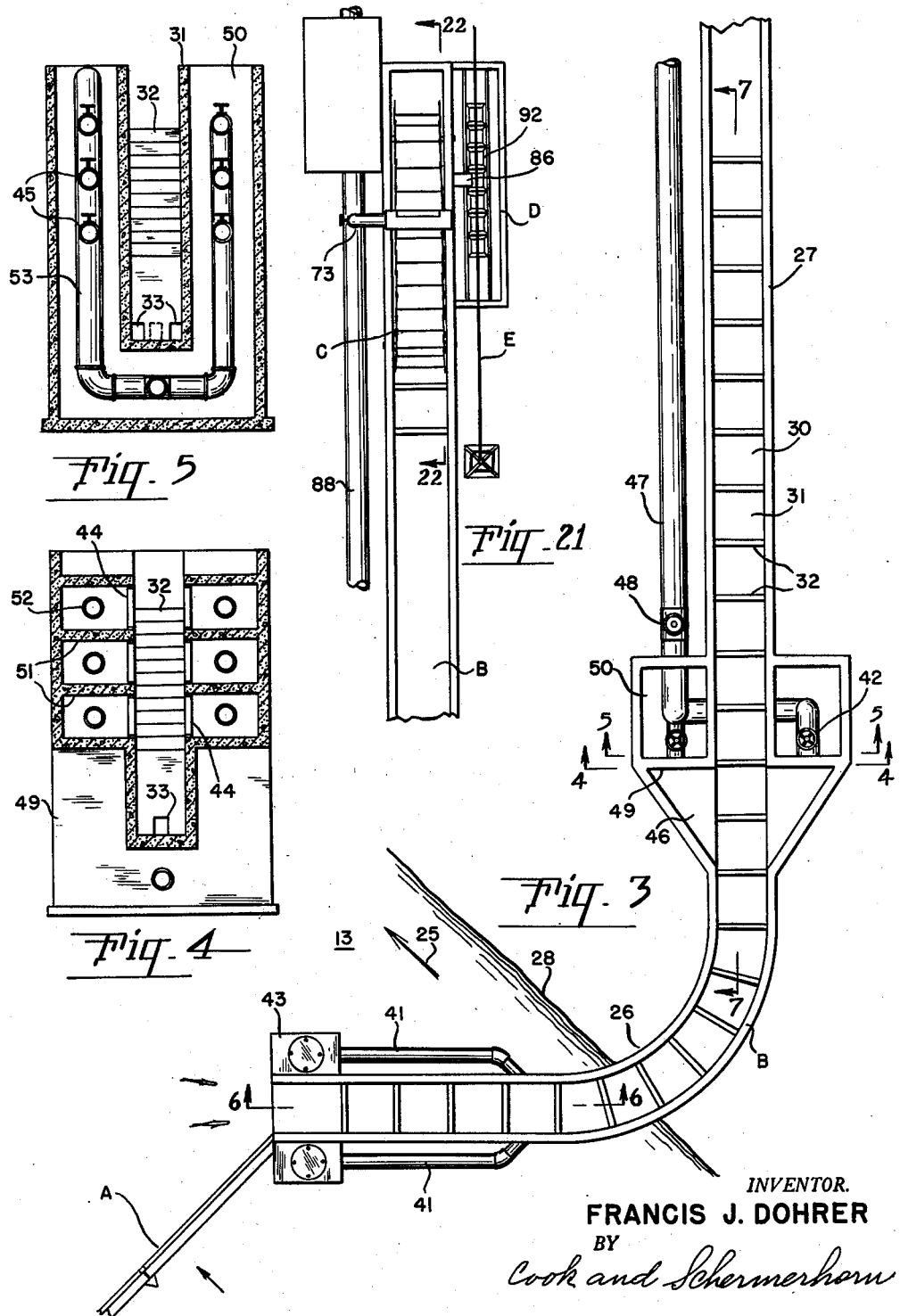

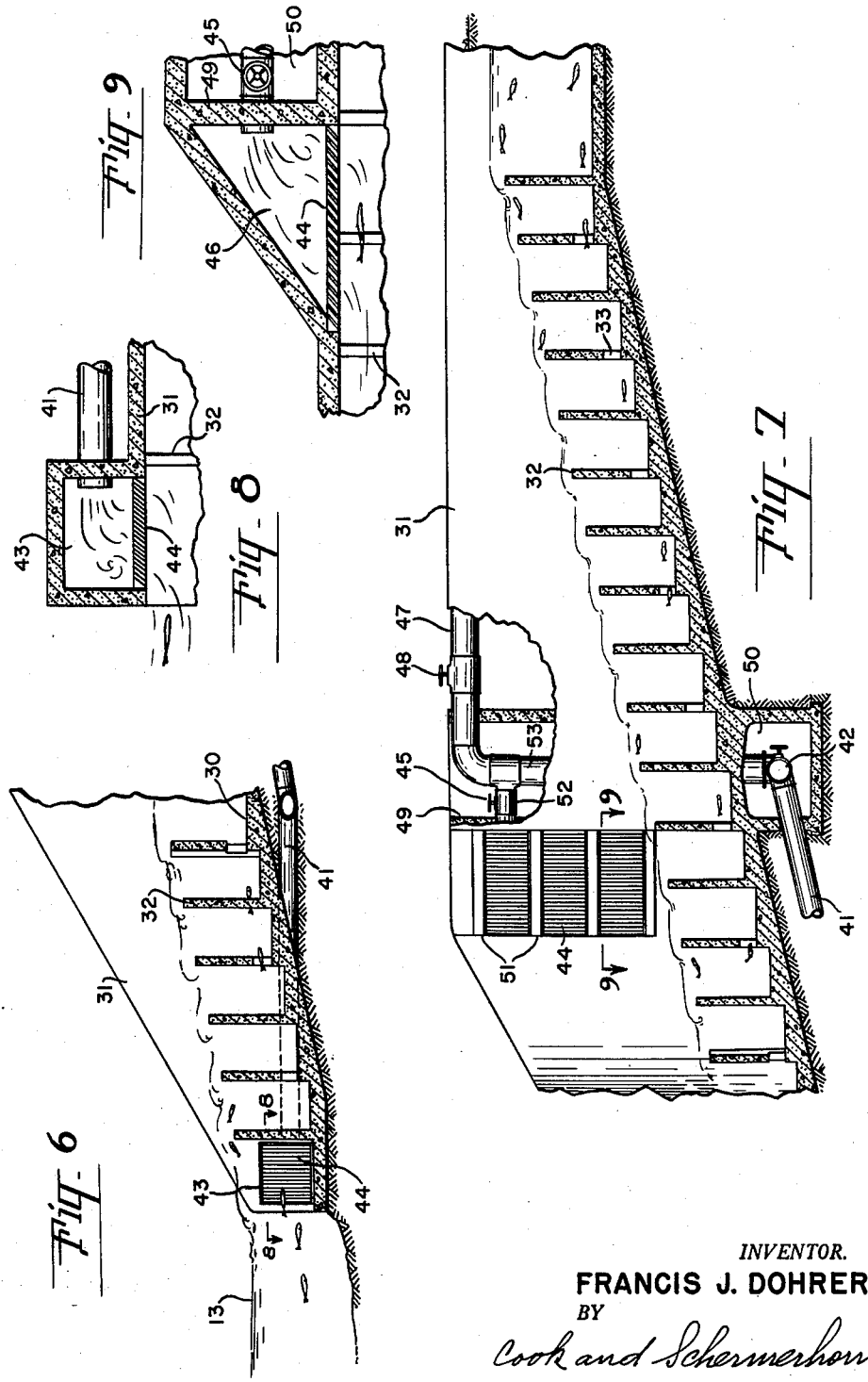

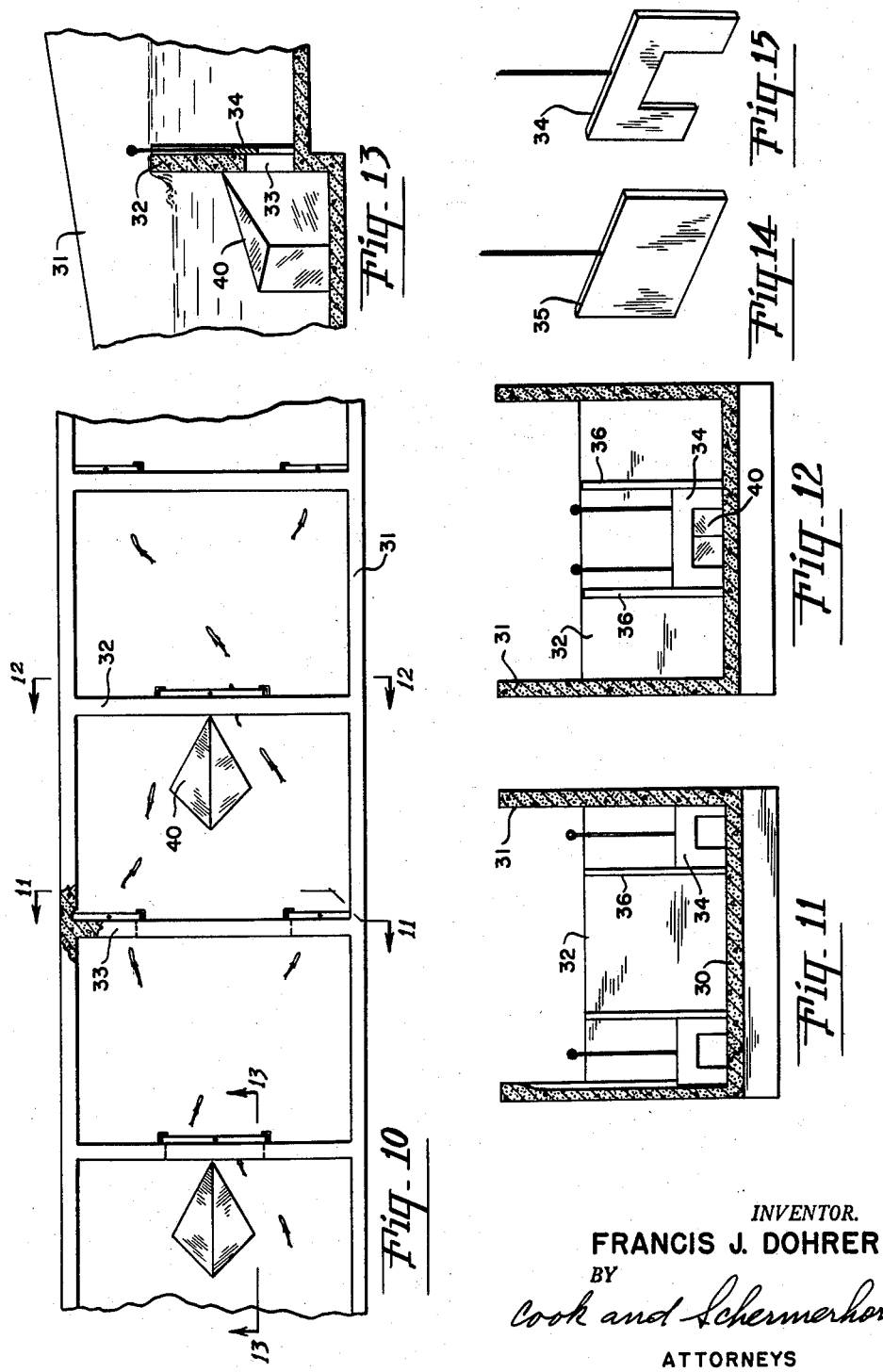

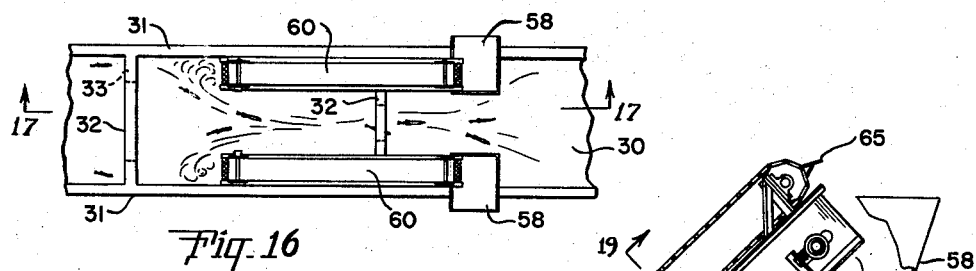
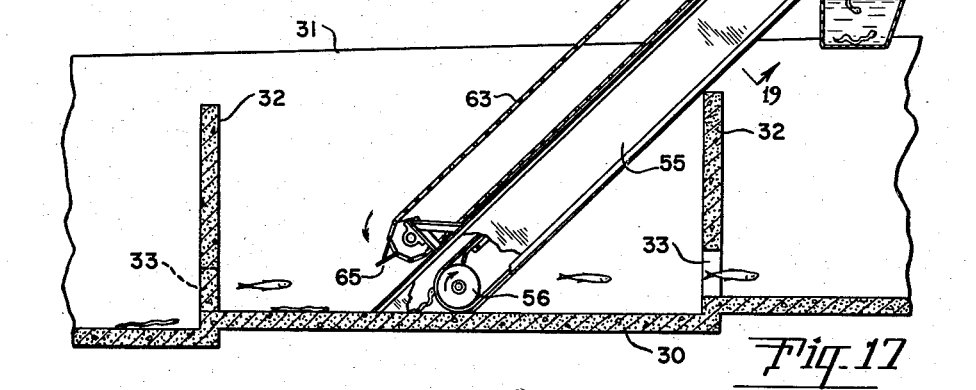
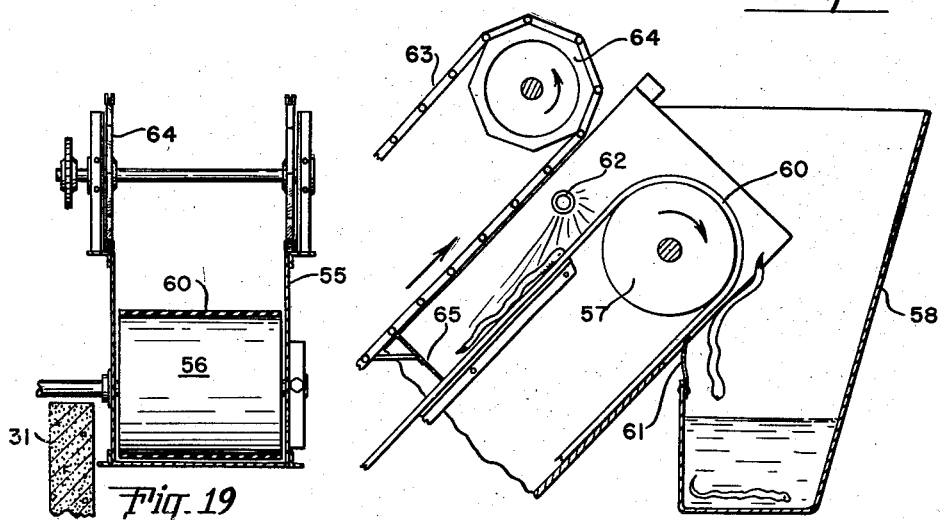

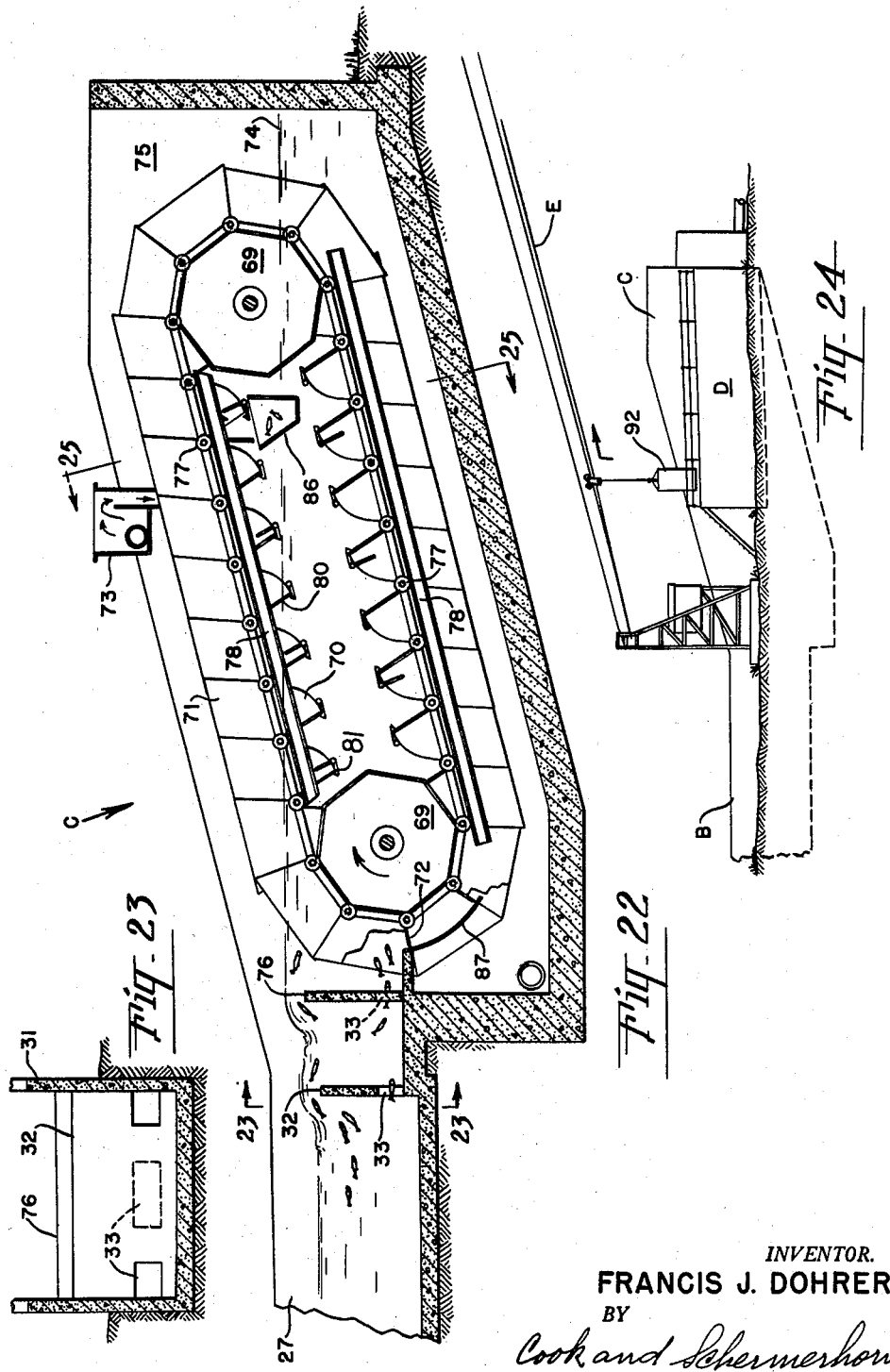

Jan. 26, 1960 F. J. DOHRER 2,922,282
FISHWAY
Filed Jan. 18, 1955 17 Sheets-Sheet 8
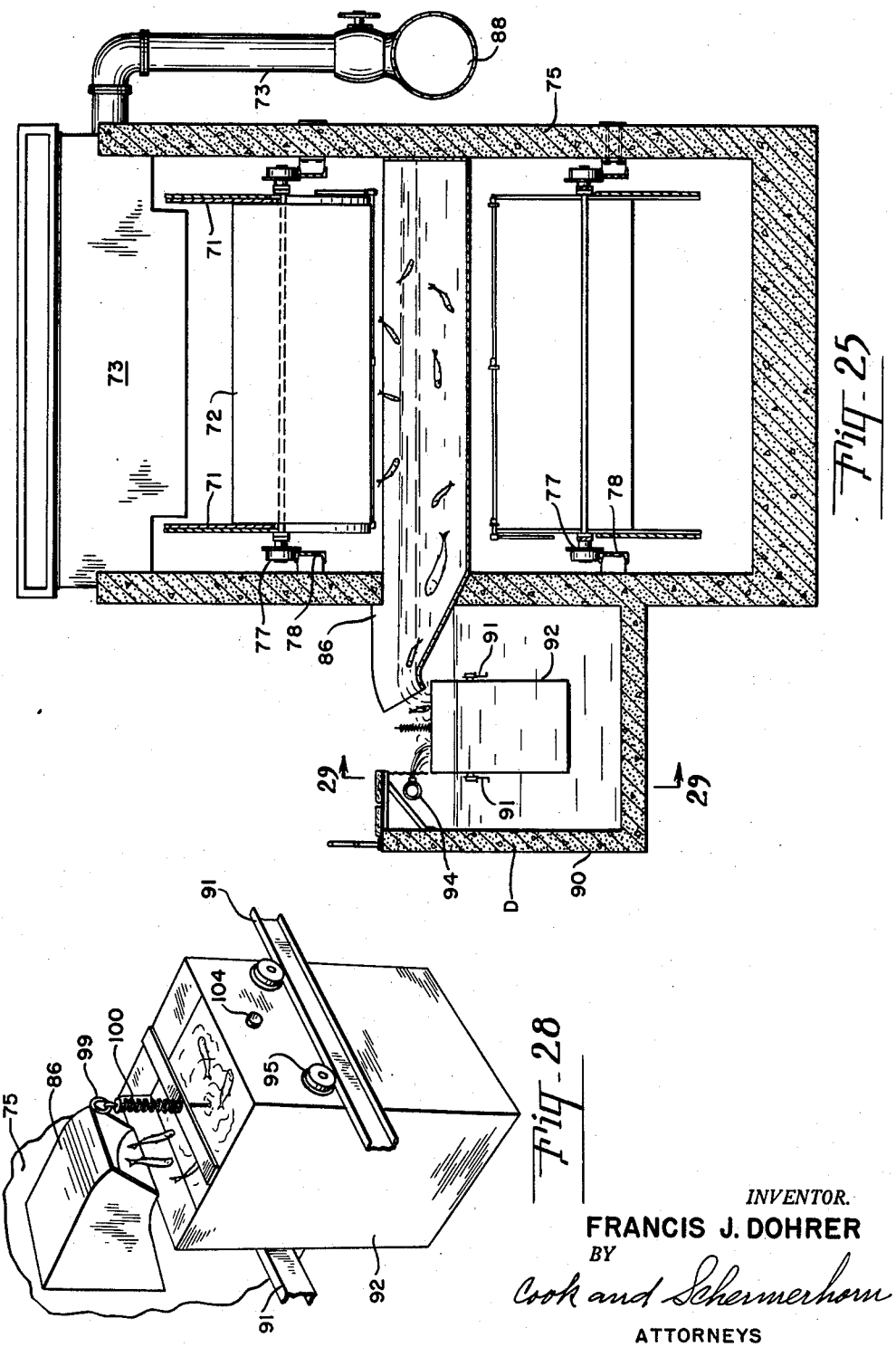
INVENTOR.
FRANCIS J. DOHRER
BY
Cook and Schermerhorn
ATTORNEYS Jan. 26, 1960 F. J. DOHRER 2,922,282
FISHWAY
Filed Jan. 18, 1955 17 Sheets-Sheet 9
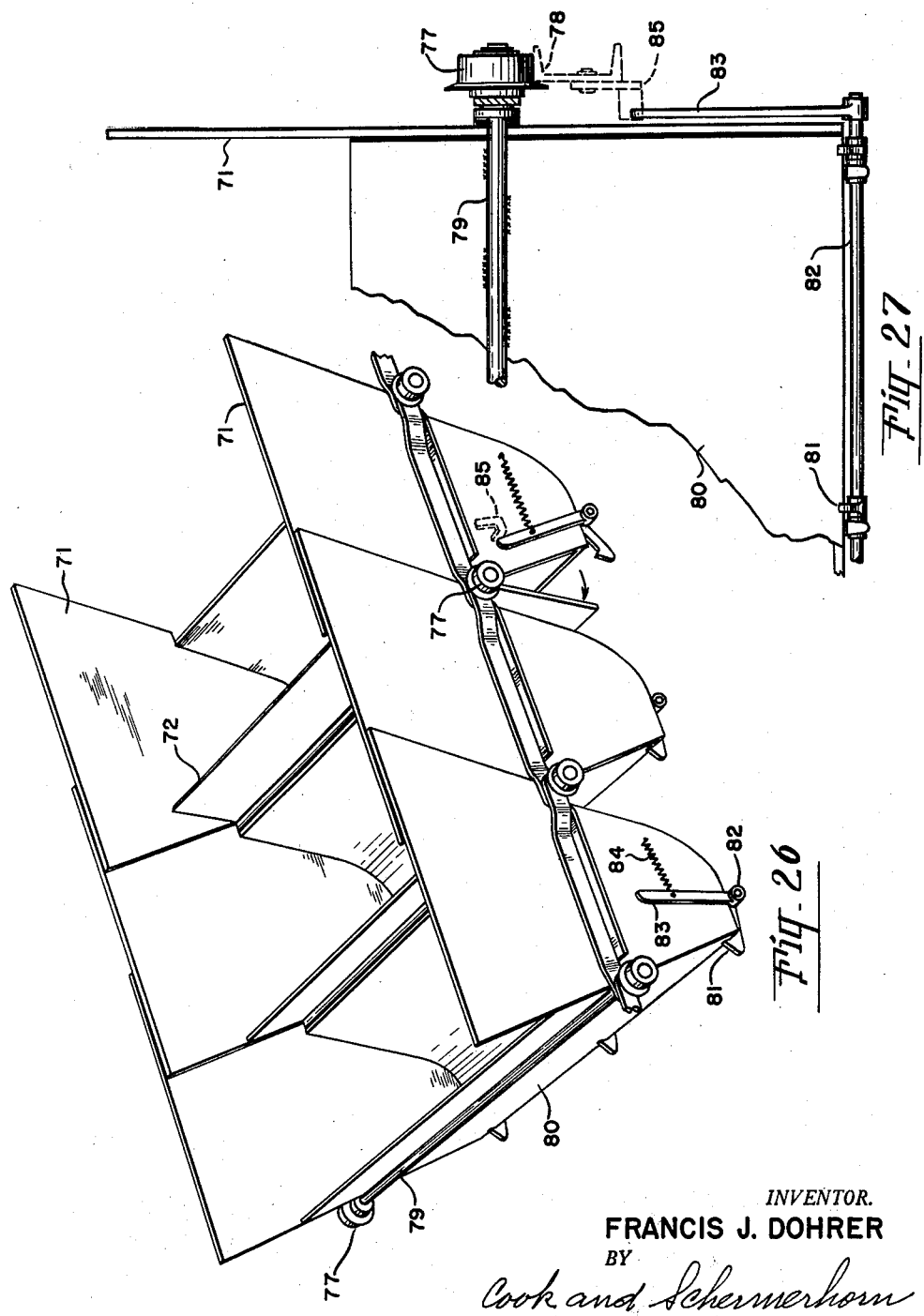
INVENTOR.
FRANCIS J. DOHRER
BY
Cook and Schermerhorn
ATTORNEYS Jan. 26, 1960  F. J. DOHRER  2,922,282
FISHWAY
Filed Jan. 18, 1955  17 Sheets-Sheet 10
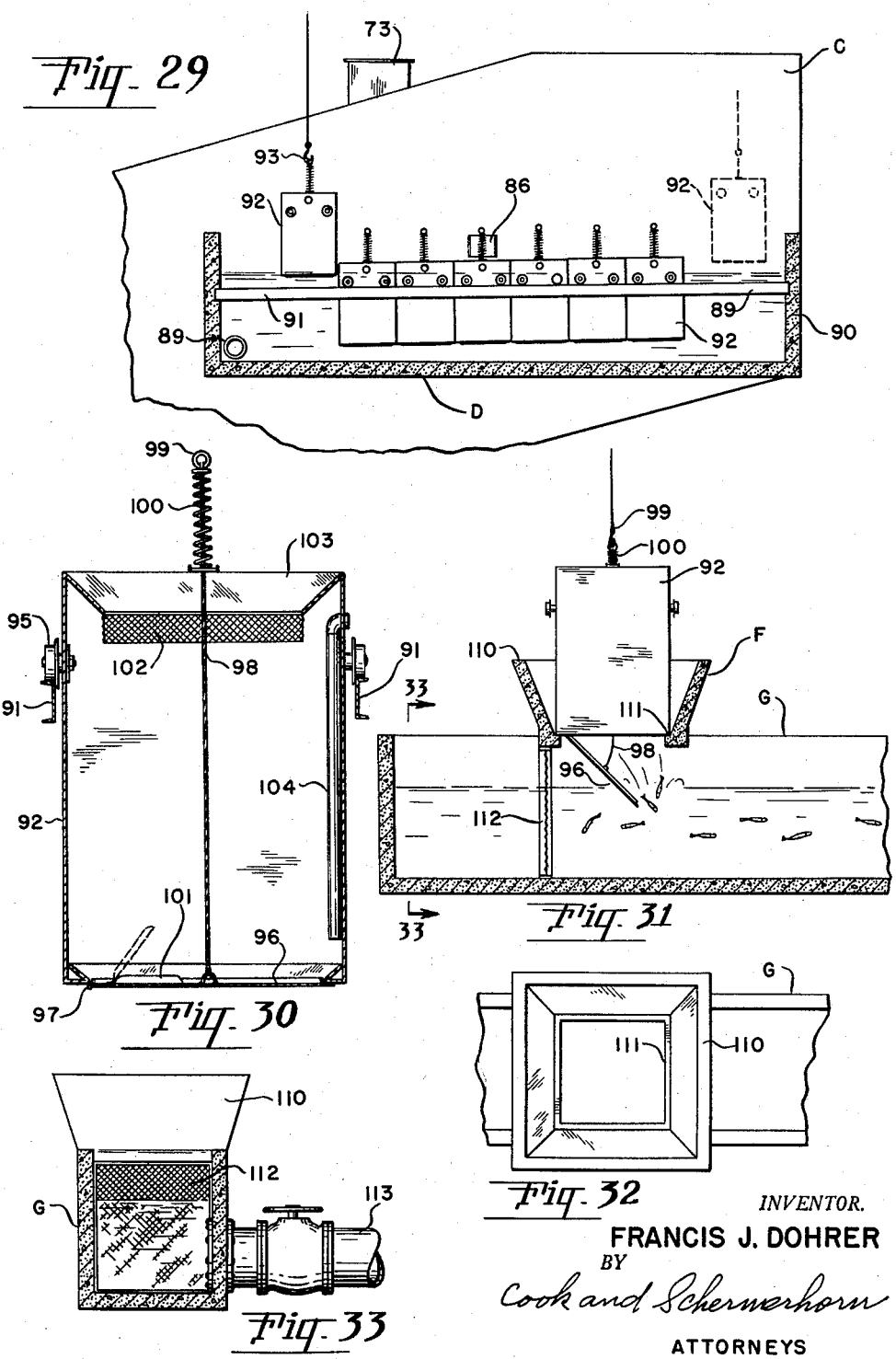
INVENTOR.
FRANCIS J. DOHRER
BY
Cook and Schermerhorn
ATTORNEYS

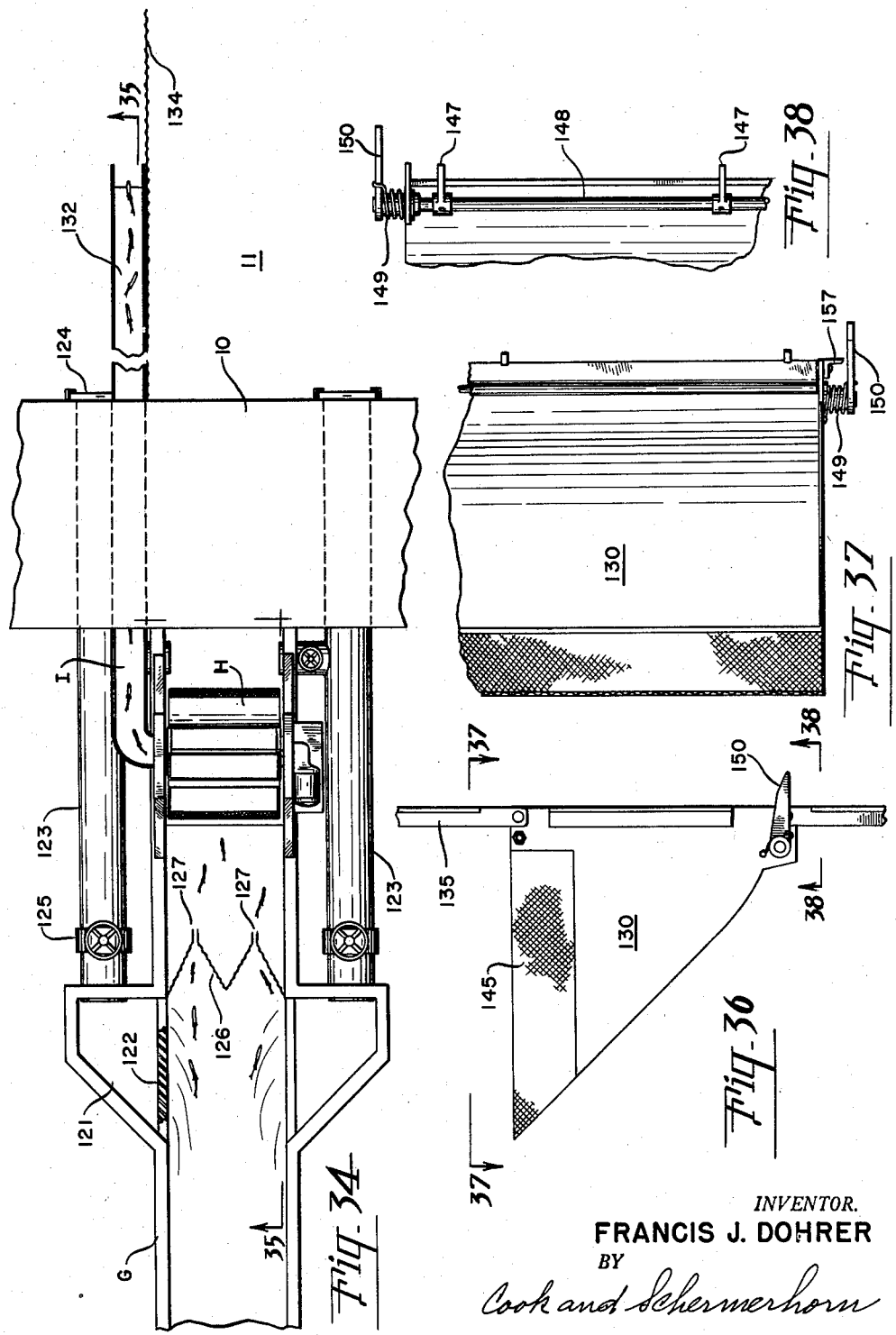

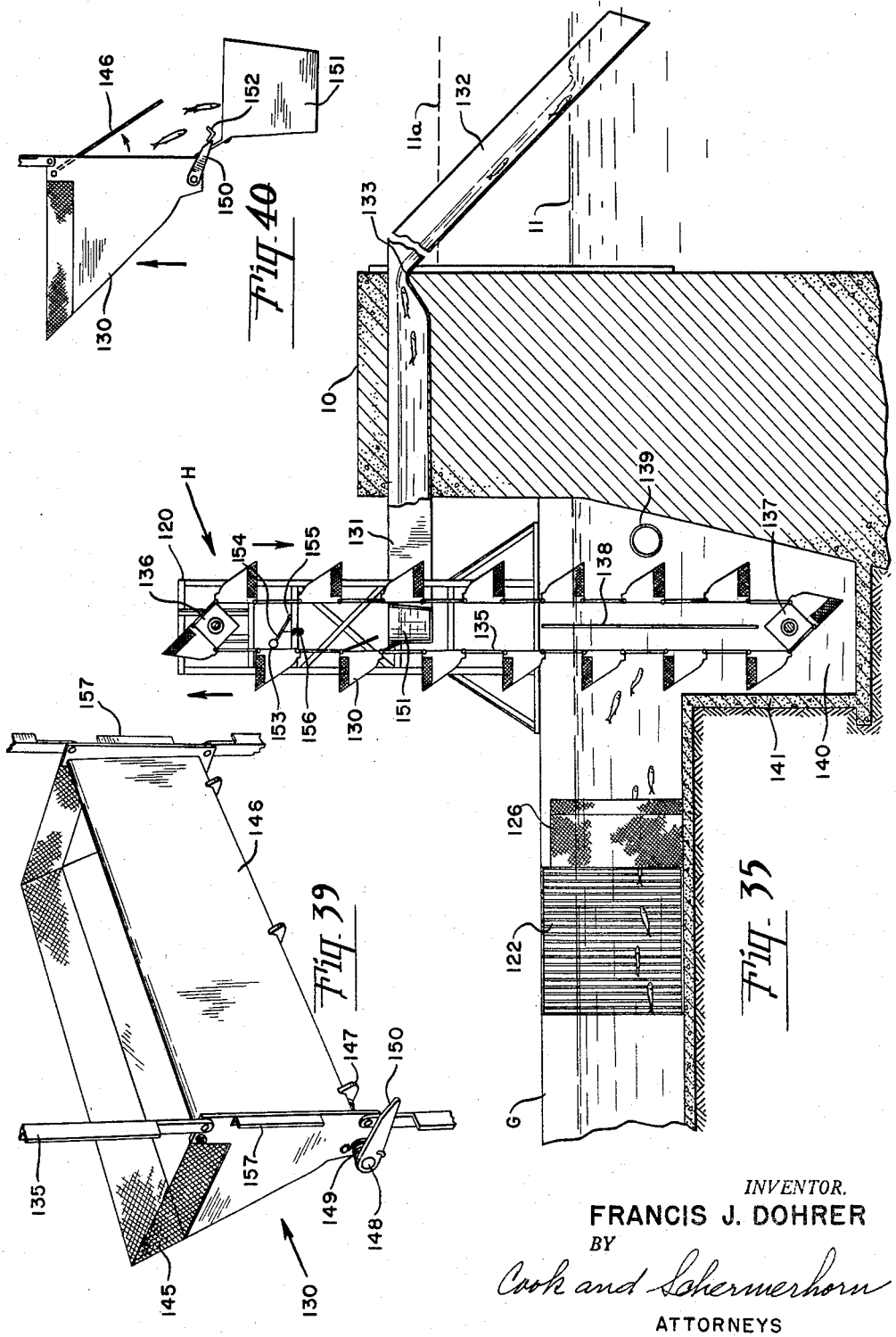

Jan. 26, 1960  F. J. DOHRER  2,922,282
FISHWAY
Filed Jan. 18, 1955  17 Sheets-Sheet 13

INVENTOR.
FRANCIS J. DOHRER
BY
Cook and Schermerhorn
ATTORNEYS

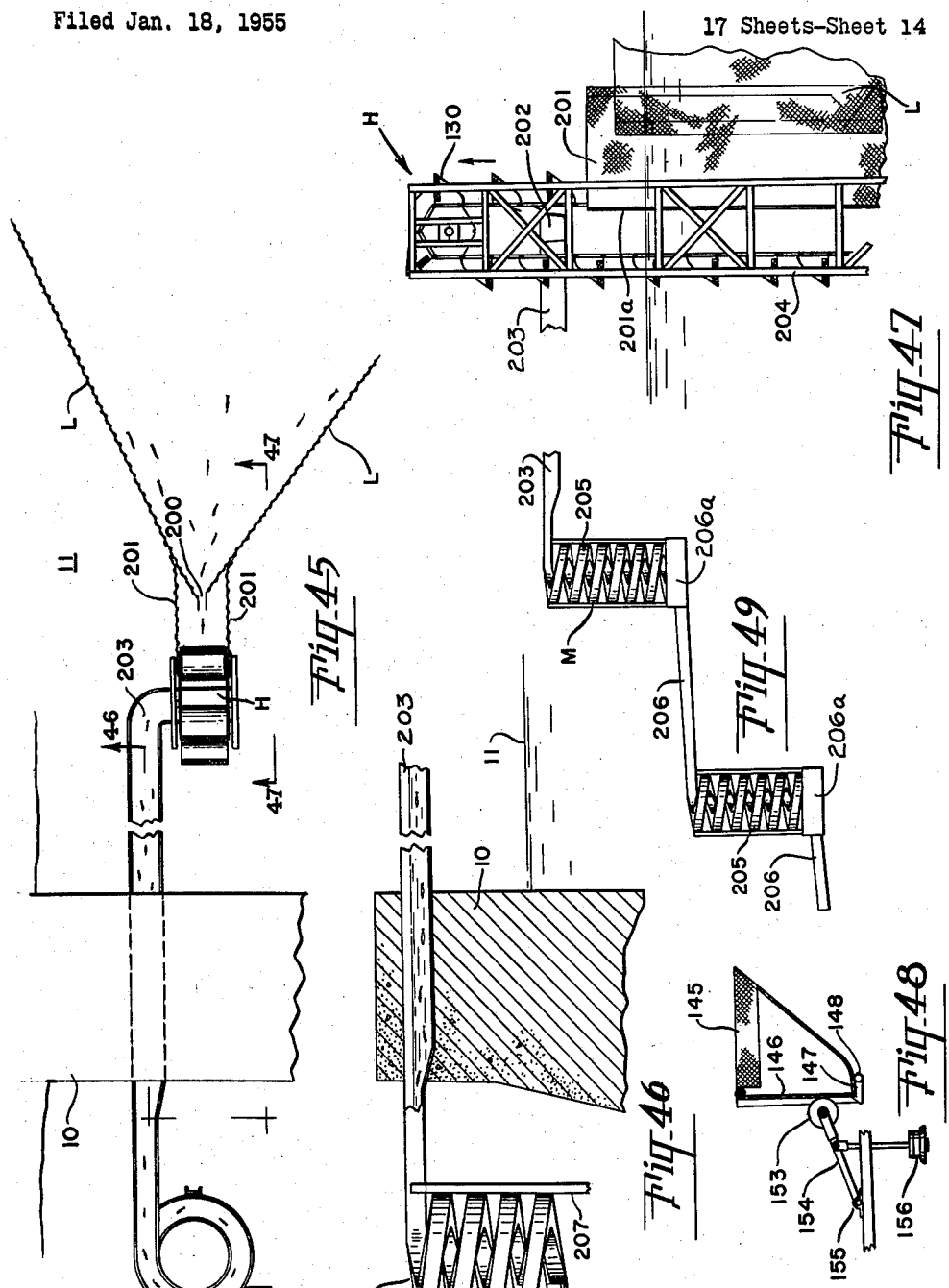

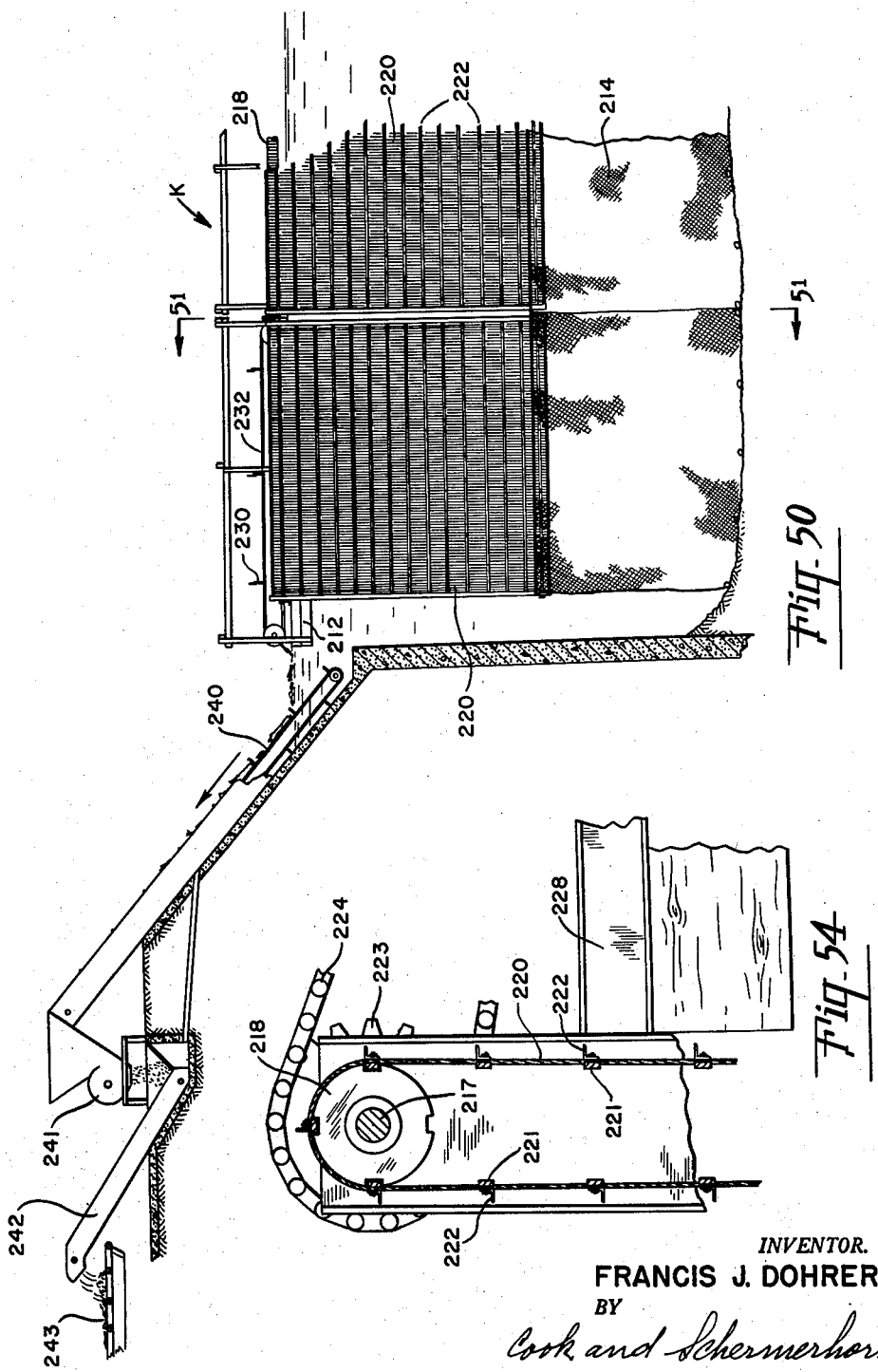

Jan. 26, 1960   F. J. DOHRER   2,922,282
FISHWAY
Filed Jan. 18, 1955   17 Sheets-Sheet 16
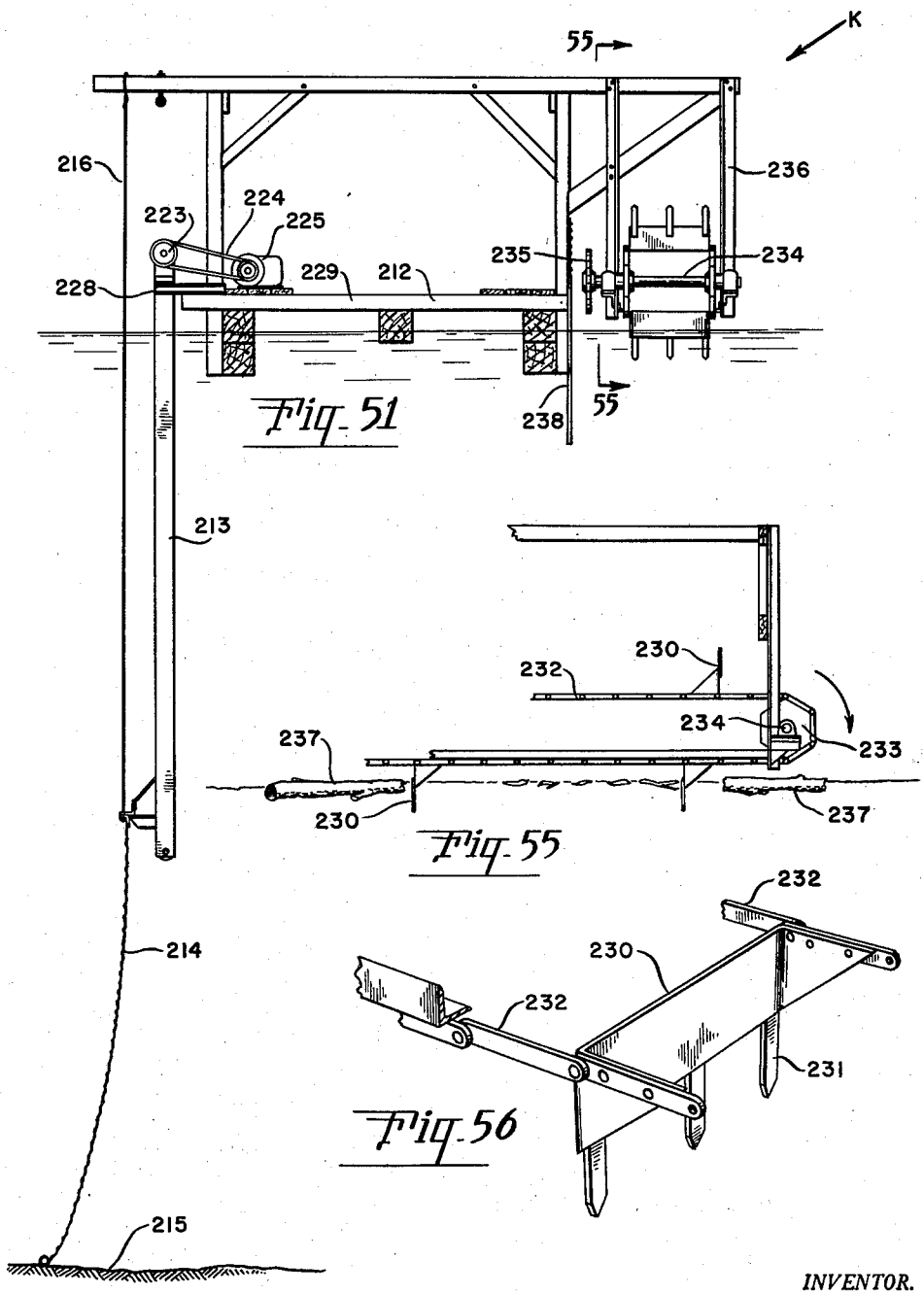
INVENTOR.
FRANCIS J. DOHRER
BY
Cook and Schermerhorn
ATTORNEYS

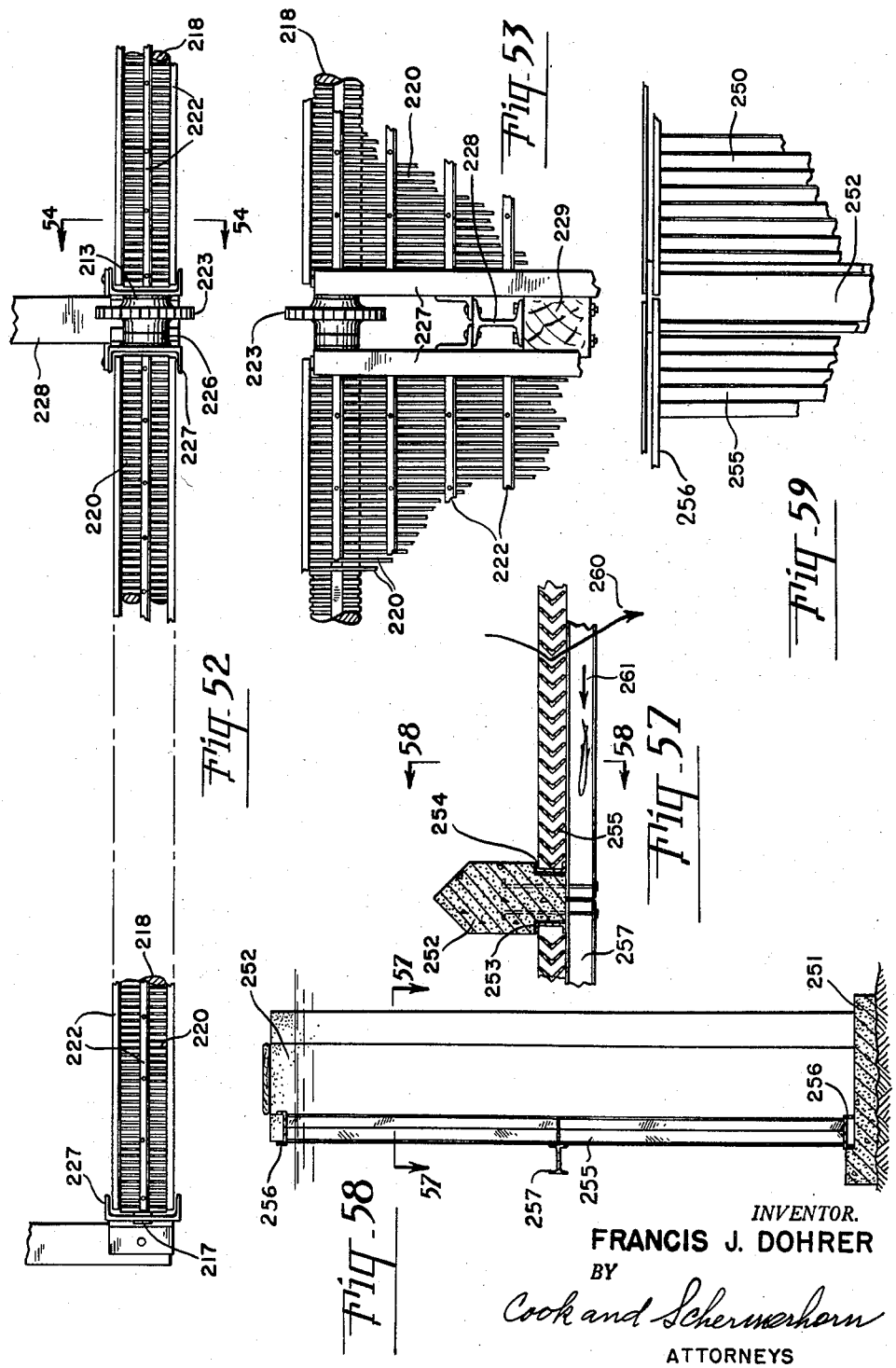

United States Patent Office 2,922,282
Patented Jan. 26, 1960

2,922,282
FISHWAY

Francis J. Dohrer, Seattle, Wash.; Cloie H. Dohrer, executrix of said Francis J. Dohrer, deceased, assignor to said Cloie H. Dohrer, as legatee Application January 18, 1955, Serial No. 482,634

9 Claims. (Cl. 61—21)

This invention relates to a comprehensive system for facilitating the passage of migratory fish over natural and man made obstructions in a river. The system includes means for assisting mature fish upstream over dams, waterfalls and other obstructions in such manner as not to delay or disorganize the continuous movement of the fish toward their spawning grounds, and means for assisting young fish, of the size known as fingerlings, downstream over such obstructions on their way to the ocean.

The invention has particular reference to the migrations of salmon which, in the last phase of their life cycle, leave the ocean where most of their adult life has been spent and return to fresh water to spawn in the upland stream or creek of their origin. The adult salmon attempt to swim upstream relentlessly against all hazards and obstacles, seeking out the headwaters of the particular stream and tributary where they originally were hatched from the eggs of their parents. When the adult salmon leave the ocean and enter fresh water to spawn, they are possessed of an irresistible urge to reach their spawning grounds before their sexual life has reached maturity, but at this phase in their life cycle their remaining term of life is relatively short and their strength, though often phenomenal, is limited. If the obstacle in their path is insurmountable, the water swift or turbulent, or if it delays tnem too long, they will die without spawning or will spawn in locations unsuited for the propagation of their offspring. The natural obstacles to such migration have been increased manyfold by the works of man, especially high dams erected across their migratory highways.

Powerhouses for the generation of electrical energy have proved to be particularly destructive to young fish. Fingerlings in the forebay are drawn through the penstock intake screens in great numbers and many are killed in the revolving blades of the turbines because they are too small to be screened out. Overflow spillways provide the only other downstream escape from the forebay of any consequence, the number of fingerlings descending the fish ladders being negligible. When there is a water shortage for hydroelectric and irrigation purposes, the spillways are opened only infrequently, if at all. When the spillways are opened, the fingerlings which may be caught in the escaping rush of water are swept downwardly at a precipitous angle and dashed at high velocity against a concrete apron or into an extremely turbulent boiling pool, from which it is believed that few escape alive.

The mature salmon, in swimming upstream, follow the strong current of the river by instinct. The relatively small flow of water discharged from the lower end of the conventional fish ladder offers a relatively weak attraction for the fish following the main current of the river. In following the stronger current, most of the fish, except those close to shore, are led past the entrance to the fish ladders directly to the discharge tubes from the turbines and the spillway pool. Here the fish become confused and try in vain to continue upstream. Different species of salmon have different migratory habits, but they all tend to travel in schools in a follow-the-leader movement. They will move in an orderly manner until their procession is broken by some adverse condition which interrupts their upstream travel. Once the procession has become disorganized, the fish will not backtrack methodically along the banks to seek out the entrances to the fish ladders, but will reach sexual maturity and die of exhaustion without spawning at all, or will spawn in the river where their young cannot survive.

In order to compensate for the insurmountable obstacles erected by man, attempts have been made to provide fish ladders and other devices, such as transfer tunnels and bare draft tubes, to assist the upstream migration, and headwaters have been stocked with fingerlings raised in a hatchery. Such compensatory efforts have been only partially successful, however, because conventional forms of fish ladders have not provided efficient means in assisting the upstream migration, and no means has been provided for assisting the downstream migration of the fingerlings, which is necessary to the fulfillment of their life cycle and the perpetuation of fish life. In conventional fish ladders mature salmon are delivered in the forebay close to the upstream side of the dam, and it is believed many of these fish so delivered are caught in the current and returned to the lower river over the spillway. In addition to fish ladders, various other means have heretofore been proposed for trapping salmon and transporting them over dams and the like, but all such known means have been unsuccessful, either because of the high cost of installation and operation, or because the apparatus frightened the fish so that they could not be induced to avail themselves of its facilities, or for both reasons.

It is, therefore, the general object of the present invention to provide an improved fishway system to facilitate the upstream migration of adult fish toward their spawning grounds, and to facilitate the downstream migration of fingerlings, in order to maintain and perpetuate fish life in spite of natural and artificial obstacles to the migratory movements.

Another object is to provide means for facilitating the upstream migration of fish which can be adapted to various types of topography and various types of natural and artificial obstructions in the river.

Another object is to provide novel means for conveying upstream migrating fish around a dam and powerhouse and for diverting the fish into such means at a considerable distance downstream from the dam and powerhouse.

Another object is to provide an improved stationary fish ladder and improved means for diverting a migrating school of fish into such a fish ladder without interrupting or confusing the continuous processional movement of the school.

Another object is to provide an improved form of stationary fish ladder requiring a lower consumption of water than conventional fish ladders.

Another object is to provide a novel form of eel trap for use in conjunction with a fish ladder and the like.

Another object is to provide a novel form of traveling fish ladder for raising migrating fish to a higher elevation with relatively little exertion required of the fish.

Another object is to provide improved means for conveying or transporting migrating fish from a stationary or traveling fish ladder to a dam forebay or lake.

Another object is to provide means for automatically loading fish from fish ladders into tanks for hoisting to upper discharge levels.

Another object is to reduce the present cost of conventional fishways by the elimination of multiple stationary fish ladders as heretofore used to raise fish over relatively low dams and also to provide a practical means of transferring migratory adult salmon over relatively high dams.

Another object is to provide a novel form of hoist mechanism for lifting fish over a dam or the like in tanks.

Another object is to provide novel means for conveying downstream migrating fish around a dam and powerhouse and for diverting fish into such means at a considerable distance upstream from the intake towers for the powerhouse penstocks.

Another object is to provide means for diverting and collecting fingerlings from the forebay water of a dam and lowering the fingerlings safely to the river level on the downstream side of the dam.

Another object is to provide a novel form of fingerling de-elevator.

Another object is to provide a novel form of fish elevator for lifting fish from a fishtrap.

Another object is to provide a novel means for removing and disposing of floating trash and debris from the forebay waters above a dam.

Another object is to provide a novel floating structure in the forebay waters for carrying fingerling diversion nets and trash removal means.

Another object is to provide means for collecting fingerling salmon in a manner whereby they may be stored and loaded into specially equipped barges for transporting downriver through ship locks below the farthest downriver dam or as near to salt water as possible.

These and other objects of the invention are accomplished in a manner which will be better understood with reference to the accompanying drawings illustrating certain preferred embodiments of the invention described in the following specification, it being understood that various changes may be made in the construction and arrangement of the various components of the system and that certain parts may be used without others according to the varying needs and topography in the different installations. The system is inherently flexible in the latter respects, and all modifications within the scope of the appended claims are included in the invention.

In the drawings:

Figure 3 is a plan view of the stationary fish ladder of Figure 1;

Figure 4 is a cross sectional view taken on the line 4—4 of Figure 3;

Figure 5 is a cross sectional view taken on the line 5—5 of Figure 3;

Figure 6 is a longitudinal sectional view taken on the line 6—6 of Figure 3;

Figure 7 is a longitudinal sectional view taken on the line 7—7 of Figure 3;

Figure 8 is a sectional view taken on the line 8—8 of Figure 6;

Figure 9 is a sectional view taken on the line 9—9 of Figure 7;

Figure 10 is an enlarged fragmentary plan view of a portion of the stationary fish ladder shown in Figure 3;

Figure 11 is a cross sectional view taken on the line 11—11 of Figure 10;

Figure 12 is a cross sectional view taken on the line 12—12 of Figure 10;

Figure 13 is a sectional view taken on the line 13—13 of Figure 10;

Figure 14 is a perspective view of a solid gate for one of the submerged weir openings shown in Figures 10 and 13;

Figure 15 is a perspective view of a gate having an opening;

Figure 16 is a plan view of an eel trap for use in the stationary fish ladder shown in Figure 3;

Figure 17 is a sectional view taken on the line 17—17 of Figure 16;

Figure 18 is an enlarged fragmentary view of a portion of the structure shown in Figure 17;

Figure 19 is a cross sectional view taken on the line 19—19 of Figure 17;

Figure 20 is a view of one of the scrapers shown in Figure 17;

Figure 1:
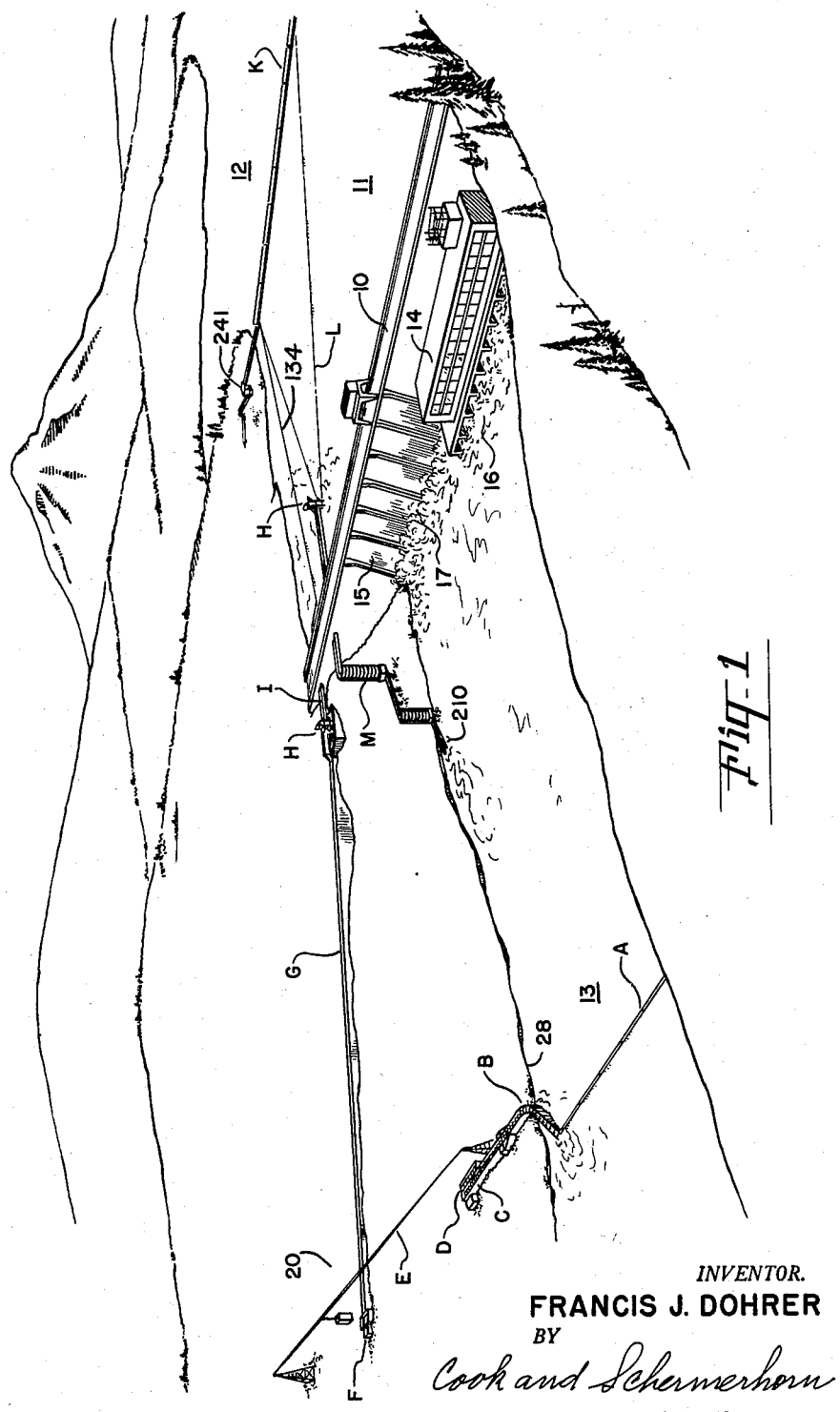
Figure 1 is a panoramic view of a dam site illustrating how the system of the invention is adapted to topography suitable for the employment of a high-line canal for receiving the upstream migrating fish from a hoist located at a distance downstream from the dam.
Figure 2:
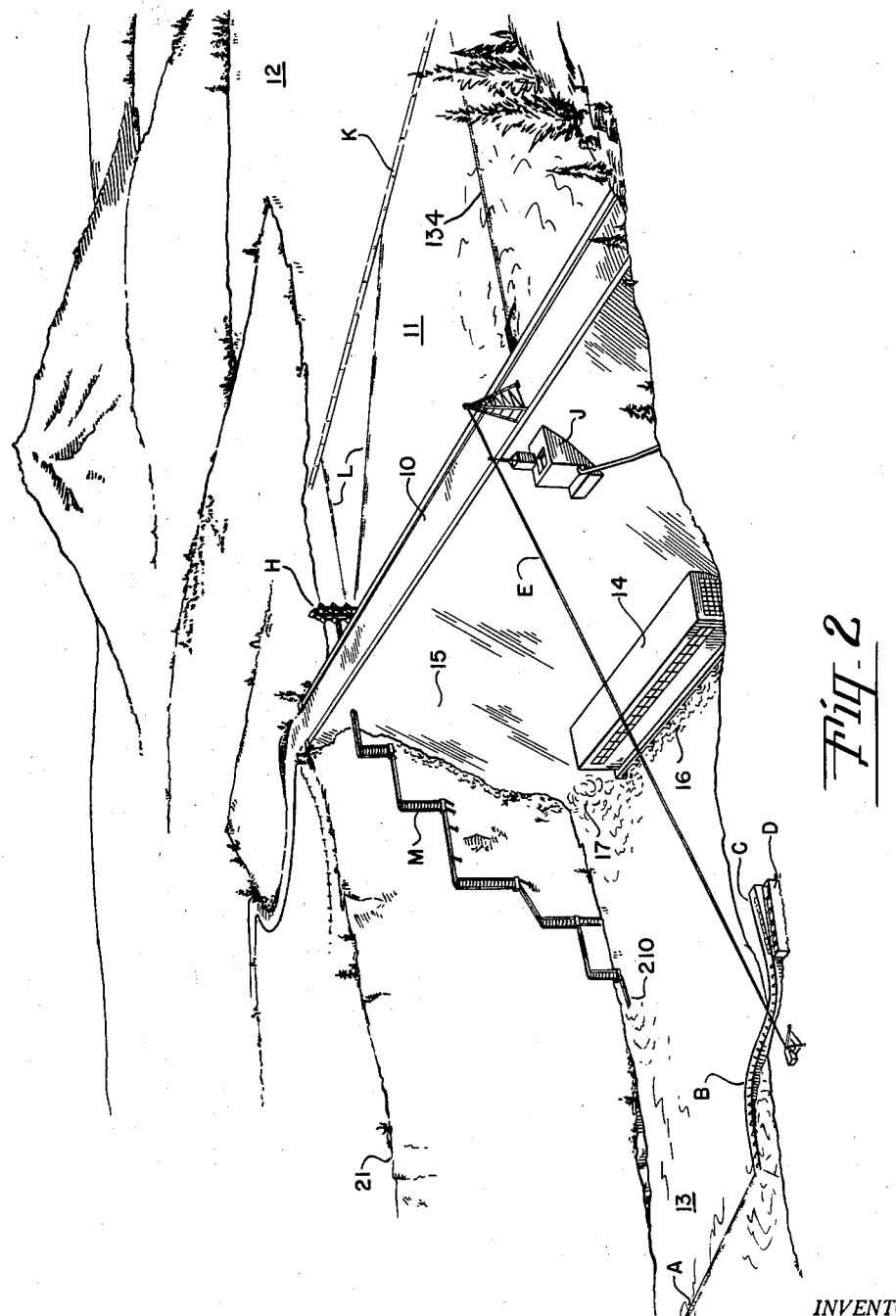
Figure 2 is a panoramic view showing a different type of topography where a highline canal cannot be used and the upstream migrating fish must be hoisted directly over the top of the dam.
Figure 41:
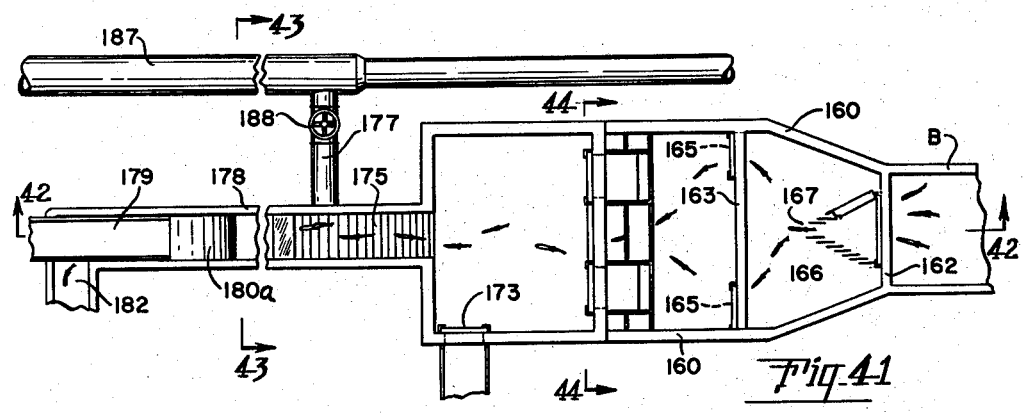
Figure 42:
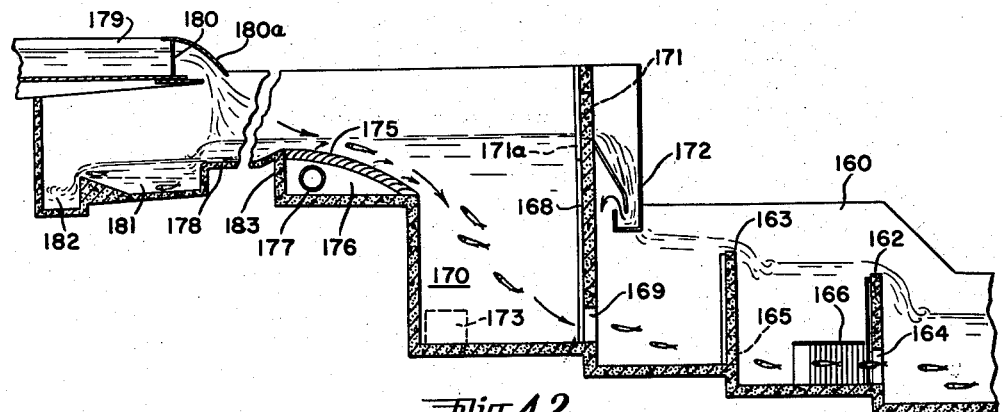
Figure 43:
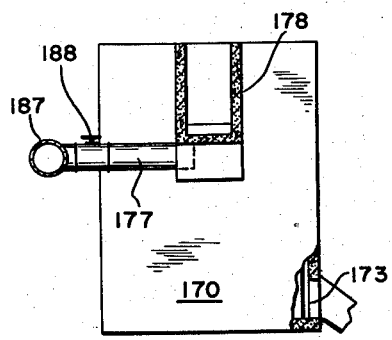
Figure 44:
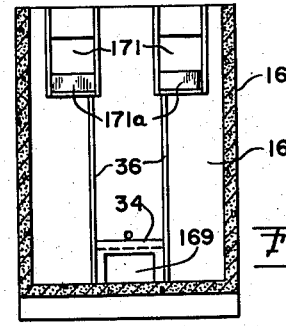

Figure 21 (on the same sheet with Figure 3) is a plan view of the traveling fish ladder and hoist loading station at the upper end of the stationary fish ladder shown in Figure 1;

Figure 22 is a sectional view taken on the line 22—22 of Figure 21;

Figure 23 is a cross sectional view taken on the line 23—23 of Figure 22;

Figure 24 is a side elevation view of the traveling fish ladder and loading station shown in Figure 21;

Figure 25 is a cross sectional view of the traveling fish ladder taken on the line 25—25 of Figure 22;

Figure 26 is a perspective view of the buckets of the traveling fish elevator shown in Figure 22;

Figure 27 is an enlarged fragmentary view of a portion of one of the buckets shown in Figure 26;

Figure 28 is an enlarged perspective view of a hoist bucket in the loading tank in Figure 25;

Figure 29 is an enlarged view of the hoist tank taken on the line 29—29 of Figure 25;

Figure 30 is a sectional view of one of the hoist buckets shown in Figures 28 and 29;

Figure 31 is a sectional view showing the discharge station for the hoist buckets;

Figure 32 is a top plan view of the structure shown in Figure 31;

Figure 33 is a cross sectional view taken on the line 33—33 of Figure 31;

Figure 34 is a plan view of a portion of the dam and highline canal in Figure 1 showing a fish elevator and flume for lifting fish from the canal to the level of the forebay;

Figure 35 is a view taken on the line 35—35 of Figure 34;

Figure 36 is an enlarged elevation view of one of the elevator buckets shown in Figure 35;

Figure 37 is a fragmentary view taken on the line 37—37 of Figure 36;

Figure 38 is fragmentary view taken on the line 38—38 of Figure 36;

Figure 39 is a perspective view of one of the elevator buckets shown in Figure 35;

Figure 40 is an enlarged fragmentary view showing one of the elevator buckets of Figure 35 in discharge position;

Figure 41 is a plan view of the upper end of a stationary fish ladder having a fishlift chamber for raising fish over the dam without an elevator;

Figure 42 is a longitudinal sectional view on the line 42—42 of Figure 41;

Figure 43 is a view taken on the line 43—43 of Figure 41;

Figure 44 is a cross sectional view taken on the line 44—44 of Figure 41;

Figure 45 is a plan view of the top of the dam showing a fingerling elevator and de-elevator for conveying fingerlings from the lake on the upstream side of the dam to the river level on the downstream side of the dam;

Figure 46 is a sectional view taken on the line 46—46 of Figure 45;

Figure 47 is a view taken on the line 47—47 of Figure 45;

Figure 48 is an enlarged sectional view of one of the elevator buckets shown in Figure 47;

Figure 49 is a fragmentary view showing two stages of the fingerling de-elevator, the uppermost stage of which is shown in Figures 45 and 46;

Figure 50 is a fragmentary cross sectional view of the forebay above the dam showing a floating boom carrying trash disposal means and fingerling lead screens;

Figure 51 is a cross sectional view through the boom and lead screens taken on the line 51—51 of Figure 50;

Figure 52 is a top plan view of the revolving screen and lead nets shown in Figures 50 and 51;

Figure 53 is an enlarged fragmentary elevation view of a portion of the self-cleaning screens shown in Figures 50 and 52;

Figure 54 is a fragmentary enlarged view of the rotating mechanism for the screens taken on the line 54—54 of Figure 52;

Figure 55 is a fragmentary view taken on the line 55—55 of Figure 51;

Figure 56 is a perspective view of one of the trash removal lugs shown in Figures 51 and 55;

Figure 57 is a view on the line 57—57 of Figure 58 showing a preferred form of fish diversion louver fence on the downstream side of the dam, designated generally at A in Figures 1 and 2;

Figure 58 is a cross sectional view of the louver fence, taken on the line 58—58 of Figure 57; and Figure 59 is a fragmentary elevation view of the louver fence shown in Figures 57 and 58.

GENERAL DESCRIPTION

Referring first to the panoramic views in Figures 1 and 2, the dam 10 forms a forebay 11 at the lower end of a lake 12 extending several miles upstream and submerging a portion of the original river valley. The river 13 downstream from the dam is supplied by flow through the penstocks of powerhouse 14 and this flow is at times supplemented by overflow over the spillways 15 directly from the forebay. The numeral 16 designates an extremely turbulent region at the outlets to the draft tubes from the turbines in the powerhouse, and the numeral 17 designates another extremely turbulent region at the foot of the dam spillways. This is a typical installation. The locations of the powerhouse and spillways may vary but the same obstacles to fish migration remain in all cases.

The usual practice is to construct conventional fish ladders around both ends of the dam having their downstream entrances on the banks of the river not far remote from the turbulent regions 16 and 17. Schools of fish swimming upstream to spawn, except those swimming close to shore, pass by the entrances to the fish ladders in large numbers and endeavor to follow the stronger currents flowing from the powerhouse or spillways. Upon reaching the turbulent regions 16 and 17, the processional movement of each school of fish is disrupted because the school can move no farther or in no particular direction as a body. The fish thereupon become confused and the school breaks up, with the individual fish darting in all directions trying to find a way of proceeding upstream. In such fruitless endeavor without progress, the fish eventually become exhausted and drift back downstream, either to die without spawning or to spawn in a place where their young cannot survive. It will also be apparent that a large percentage of young fish migrating from the headwaters to the sea cannot survive passage through the powerhouse or the abrupt descent over the spillways.

The present invention is intended to solve the aforementioned problems and can be accommodated to the contour of the stream valley. In Figure 1 there is shown a type of valley having a region of high ground, designated by the numeral 20, extending downstream more or less parallel to one of the river banks at a distance back from the river. The ascent from the river 13 to the region 20 may be steep and rugged, but once the approximate elevation of the top of the dam is attained, easy access may be had to one end of the dam. This is a typical shape of valley formation.

Another application of this arrangement is where the dam itself is located in a canyon, such as the Hoover Dam on the Colorado River, and the proposed Hell's Canyon Dam on the Snake River. These dam sites are in a narrow or box canyon, while the land above the canyon is fairly level or rolling. Under these circumstances, it is impossible to install fish ladders, owing to lack of space and the height of the dam. However, the fishways and hoists shown on Figure 1 can be applied to such a situation. Certain components of the present system, such as the diversion louver fence, fish ladders, both stationary and traveling, loading tanks, hoists, etc., can be installed where the canyon opens up into a valley which may be some distance below the dam structure. The fish are delivered by a hoist to a high line canal, where they can swim to a point above the dam and thence into the forebay or lake as hereinafter described in detail.

In Figure 2, a different type of typical topography is shown wherein the high ground at 21 downstream from the dam does not provide an easy access to one end of the dam. This portion of the terrain may be rough or mountainous, or cut with steep ravines, so that it will not accommodate certain of the appurtenances of the invention shown in Figure 1. In such case, the principles of the invention are applied in a different way to accomplish the objects of the invention in the manner hereinafter described in detail.

Referring again to Figure 1, the principal elements of the invention will now first be described in a general way. At a convenient point, depending on the terrain and stream flow conditions, some distance downstream from the turbulent regions 16 and 17, a vertical lead net or an angle louver fence A is built across the river, suspended vertically from a floating log boom or built on a fixed structure as shown in Figures 57, 58 and 59. When an approaching school of fish, swimming upstream, encounters the net or angle louver fence, the school is led by the net or directional angle of the current on the downstream side of the louver fence directly into the entrance of the stationary fish ladder B without disturbing the school formation or delaying the forward movement of the migrating fish. The school is not abruptly stopped nor turned back, but merely deflected on a different course by the louver fence and water jetting therefrom at approximately 45 degrees from its original direction. Thus proceeding, the school reaches the entrance to a stationary fish ladder B. Both the floating lead net or fixed louver fence A and fish ladder B are designed to accommodate a fluctuating level of the river 13.

The school of fish, still traveling in orderly fashion in a body up the stationary fish ladder B, reaches a novel form of traveling fish ladder C at an elevation above high water. A section of open canal may be used between the head of the stationary fish ladder B and the traveling fish ladder C when the terrain requires. The traveling fish ladder C assists the fish up another incline to a loading tank D for a hoist E. The fish are trapped and discharged into hoist buckets in the loading tank D in a manner such that they cannot return down the fish ladders, and are lifted in such buckets by way of the hoist E to an unloading station at F on the high ground 20 some distance back from the river. From the unloading station F the fish proceed along a high line canal G at an elevation which may be somewhat below the forebay level in order to supply the canal with water from the forebay 11. When this is the case, a fish elevator or other elevating device H raises the fish to a higher level to proceed through or over one end of the dam by way of a canal or flume I to the forebay 11. Thus over the dam and deposited in the quiet water of the forebay, the fish may rest or proceed directly through the lake 12 to their predestined spawning grounds. Flume I, or a lane fenced off by nets close to shore, extends beyond the forebay and well up into the lake 12 to prevent fish from returning over the spillways. Also, when the topography permits, the canal G may extend a mile or more downstream from the dam to the best location for lead fence A and the fish ladders B and C.

Still referring to Figure 1, the present invention also provides convenient means for conveying the fingerlings over the dam in a downstream direction. Small fish hatching in the upper reaches of the streams which are tributary to the lake 12 gradually migrate downstream on their way to the open sea. A floating boom, barges, or chain of rafts K, is disposed preferably in a diagonal direction at some convenient location across the lake 12, carrying vertically hanging fingerling nets of relatively fine mesh. The fingerling nets may also be supported on permanent structures such as piling or piers. For convenience of illustration the boom K is shown practically in the forebay 11 but it is to be understood that in practice this boom may be installed at a considerable distance above the dam, preferably at a narrow point in the lake where the contour of the bottom does not require the fingerling nets to extend down to a great depth. Fingerlings proceeding downstream through the lake 12 are deflected by the lead net at K into an arrangement of nets L forming a fish trap. The fish trap nets L leads the fingerlings to a fish elevator H by which they are raised above the water level for conveyance through or over the dam in a suitable flume. Thence, the fingerlings descend by novel spiral de-elevators M to the river level at a safe point downstream from the turbulent regions 16 and 17. The lead net or louver fence A has a large mesh, or openings, allowing the fingerlings to pass through freely as they proceed downstream.

Referring now to Figure 2, it will be observed that certain elements of the invention already described in connection with Figure 1 are employed in a somewhat different arrangement to fit the different topography. When the valley downstream from the dam is too narrow, or the sides are too high, steep or rugged to accommodate the high line canal G in Figure 1, the hoist E may be arranged to carry the fish from the travelling fish ladder C directly to an unloading station J in the dam itself. An opening is provided through the dam communicating with the forebay side whereby, as soon as the fish are discharged from the hoist E, they have immediate access upstream through the lake 12. In case the head of the stationary fish ladder is too far downstream, a canal can be built between B and C.

In both of Figure 1 and Figure 2, suitable means are provided, either by way of a canal along the shoreline of forebay 11, or nets directly in the forebay, to lead the upstream migrating fish to some point in the lake 12 from where they will not tend to return downstream over the spillways. Such features will be explained in greater detail as the description proceeds.

*Stationary fish ladder*

Figure 3 is a plan view of the stationary fish ladder B shown in Figure 1, the direction of the current in the river 13 being indicated by arrow 25. This fish ladder comprises a lower portion 26 which may be submerged at high water and an upper portion 27 which may be partially submerged at high water. Figures 1 and 3 show the position of the river bank 28 near the low water level.

Both sections 26 and 27 are preferably constructed of concrete having a bottom wall 30, side walls 31 and transverse partition walls 32 forming weirs over which the water may be caused to cascade, as in a conventional fish ladder, or through which the water may be caused to flow by way of submerged openings 33, as shown in Figures 10 to 13. This new type fish ladder is convertible and can be used as a submerged orifice fish ladder or an overflow fish ladder, or a combination of both types. The size of the submerged opening may be varied by the use of different gates 34, as shown in Figure 15, or it may be closed entirely by solid gates 35, as shown in Figure 14. The transverse walls 32 are equipped with vertical guides 36 on opposite sides of the openings 33 for the gates 34 and 35. When the solid gates 35 are installed, all the water is forced over the top of the transverse walls 32, which are lower than the side walls 31, and, when the apertured gates 34 are installed, the flow down the fish ladder may be divided, with part of it going through the submerged openings and the remainder overflowing the crests of partition walls 32. By reducing the flow or removing gates 35, the water level in the fish ladder may be maintained below the crests of partition walls 32 to cause all the flow to go through the submerged openings.

Preferably, the submerged openings 33 are located in the centers of alternate partition walls 32 and along the side walls 31 in the intervening alternate partition walls 32 to produce alternate division and confluence of the bottom currents as shown in Figure 10. Splitters in the form of concrete blocks 40 are installed on the downstream side of each central opening to direct the bottom currents in well defined streams, leaving more quiescent pools in other regions where the fish may pause and rest temporarily in their upstream passage if they so desire. Each chamber between two of the partitions 32 forms a pool which may be traversed directly when a fish is fresh and energetic, and which has relatively quiescent portions for rest periods when the fish is tired. The present arrangement accommodates the different instinctive habits of the bottom fish, as well as those species normally swimming near the surface. It is believed that bottom fish are reluctant to enter conventional fish ladders because they dislike swimming on the surface to ascend the cascading waterfalls over each partition of the fish ladder. The amount of water to operate this new type of fish ladder does not depend on the river level and is completely under valve control and supplied from the forebay.

Referring now to Figures 3, 6 and 7, pipes 41 equipped with valves 42 are arranged to produce a strong current from the lower end of the fish ladder at low water in the river to simulate the flow of a tributary or side stream entering the river 13. This water is distributed through submerged louver chambers 43 on both side walls 31 at the extreme end of the ladder and immediately at one end of the downstream side of the lead net or fence A. The louver chambers 43 are equipped with closely spaced vertical louvers 44 turned in a downstream direction, as shown in Figure 8. The large fish cannot pass through the louvers, but are attracted by the strong current, and, once in the entrance to the fish ladder, they proceed upstream against the current flowing over and through the partitions 32.

At high water when the lower section 26 is submerged the valves 42 are shut off and other valves 45 are opened to supply the higher louver chambers 46. At the various stages of high water, a portion or substantially all of the louver chambers 46 may be submerged beneath the river level in the same manner that the lower louver chambers 43 are shown submerged in Figure 6 at low water. Supply pipes 47 equipped with valves 48 are fed from the forebay water. A vertical partition 49 separates the louver chambers 46 from a dry well valve chamber 50. A plurality of horizontal partitions 51 form decks at different levels in the louver chambers 46 to supply water from the branch pipes 52 through the louvers at one or more different levels as may be desirable, according to the level of the river. The decks 51 thereby form a plurality of vertically superimposed louver chambers which may be activated individually or in combination. The pipes 52 are all supplied from a common manifold pipe 53 connected with the supply pipe 47. Water supplied through chambers 46 can also be used to maintain a downstream flow through the fish ladder when flood waters in the river tend to create back flow in the ladder entrance.

Eel trap

Figures 16 to 20 illustrate a novel form of eel trap which may be used advantageously in conjunction with the stationary fish ladder. A frame 55 is disposed in an inclined position in one of the ladder chambers, as shown, with a lower drum or belt pulley 56 adjacent the bottom 30 and an upper drum or belt pulley 57 overhanging a transverse disposal trough 58. The pulleys 56 and 57 carry a smooth rubber or nylon belt having an upwardly travelling upper surface to which the eels cling, as shown, in preference to the relatively rougher concrete walls of the fish ladder. As the belt 60 passes around the upper pulley 57, the eels are removed and discharged in the trough 58 by the action of a scraper blade 61. The top surface of the belt may be kept wet with a water supply pipe 62.

Mounted immediately above and parallel with the upper reach of the belt 60 are a pair of chains 63 trained around sprocket wheels 64. The chains 63 are equipped with a pair of stiff wire mesh scraper blades 65 at equidistant points on the chains whereby the chains may be stopped with both scraper blades out of contact with the belt 60, as shown in Figure 17. The belt 60 travels continuously at a nominal speed, and whenever there is an excessive accumulation of eels on the side sheets of the casing 55, the chains 63 may be operated periodically at a slower speed to scrape them off. By stopping the chains 63 with the scrapers 65 in the position shown in Figure 17, the scrapers do not interfere with the normal upward movement of the eels on the belt 60 when it is not necessary to use the scrapers.

The eel trap device is narrow relative to the width of the fish ladder, and, preferably, two of the eel traps may be used along the side walls as shown in Figure 16, leaving a wide clear space therebetween for the free passage of fish. Eels habitually seek the side walls of a fish ladder and thereby encounter the moving belts 60. Since eels prey on small fish life and also attach themselves to large fish, it is highly desirable to prevent the upstream migration of eels and prevent them from being conveyed or transported along with the fish.

Traveling fish ladder

The construction of the traveling fish ladder C is shown in Figures 22, 23, 25, 26 and 27. A pair of sprocket drums 69 carry a series of buckets 70 linked together in endless chain fashion for articulating movement around the sprockets. The buckets have overlapping end walls 71 which are adapted to slide upon each other and form the side walls of an inclined trough above the level of the upstanding crest walls 72 between adjacent buckets. Water is supplied from an overhead distributing trough 73 in sufficient quantity to fill the upwardly traveling buckets and overflow the crest walls 72 in a series of cascades in the manner of a conventional fish ladder. Fish arriving from the upper portion 27 of the stationary fish ladder or the extended canal, pass through another partition wall 32 having a submerged orifice on each side wall as shown in Figure 23. The fish then pass through this pool and over or through partition wall 76 or through a center submerged orifice 33 into the pool 75 containing the traveling fish ladder and are carried upwardly above the water level 74 which is maintained in the traveling fish ladder well 75 by the transverse partitions 76. Tired fish are thus given an opportunity to rest in the buckets and be carried upwardly by the movement of the buckets, while more energetic fish may proceed to leap the crest walls 72 from bucket to bucket, if they so desire.

The upper and lower flights of the bucket chain are supported by wheels 77 running on inclined tracks 78. The wheels 77 are mounted on the outer ends of rods 79 which also carry swinging doors 80 normally closing the bottoms of the buckets. The doors 80 are held closed by latch fingers 81 on a rotatable latch rod 82. One end of latch rod 82 is equipped with a trip arm 83 normally held in latched position by a spring 84. A projecting latch release 85 on the underside of track 78 engages the trip arms 83 to unlatch the doors 80 and discharge the contents of each bucket one by one into a transverse trough 86 which projects out through one wall of the travelling fish ladder well 75. The doors 80 re-close and latch themselves by gravity as the buckets pass around the upper sprocket drum 69.

Adjacent the lower sprocket drum 69 a curved plate 87 is mounted to extend between the bucket end walls 71 into close proximity with the bucket crest walls 72 to prevent fish from entering the well 75 outside of the buckets. The water distributing trough 73 is supplied from the forebay water through a pipe 88. An equalizing pipe 89 and valve between the fish ladder and tank loading pools maintains an equal water level in both, and the valve can be shut off for cleaning the tank pool. Tank D is also equipped with a pipe and valve for draining.

Bucket hoist

Fish discharge trough 86 from the travelling fish ladder has its terminal end in communication with the hoist loading tank D as shown in Figure 25. The hoist loading tank D comprises a tank structure 90 having a pair of parallel inclined tracks 91 for a series of hoist buckets 92. Loaded buckets are removed from the lower end of the tracks by hoist hook 93 and empty buckets are replaced at the upper end of the tracks so that the empty buckets roll by gravity under the discharge end of trough 86 from the travelling fish ladder, as shown in Figures 25 and 29. The water in the tank 90 retards the downhill coasting movement of the buckets so that they are not damaged in running together after a bucket has been removed from the lower end. To facilitate lowering the empty buckets into position, the upper end 89 of the tracks may be spread apart, forming a wider opening therebetween. A perforated water supply pipe 94 extending above one of the tracks 91 pours streams of fresh water into those buckets which have been loaded with fish from the trough 86 and are awaiting removal by the hoist. A suitable wire fence extends upwardly above the loaded tanks to prevent jumping fish from falling into the tank pool.

Each bucket is equipped on two opposite sides with wheels 95 to ride on the tracks 91. The bottom 96 of each bucket is hinged at 97 and equipped with a lift cable 98 having a lifting eye 99 and a spring 100 to hold the bottom closed when the bucket is empty. The bottom 96 is equipped with a flap valve 101 which will open and admit water quickly so that an empty bucket will not tend to float when it is lowered into the tank 90. The upper portion of the side walls may be screened, as shown at 102, to hold the water level below the top of the bucket when the bucket is lifted out of the tank, and the upper edge may be flanged inwardly, as shown at 103, to reduce the likelihood of fish jumping out of the bucket. A water circulating pipe 104 is mounted on the side wall of each bucket to circulate water out of the bottom of the bucket while the bucket, after being loaded with fish in the tank 90, is waiting for the next trip of the hoist. Water introduced at the top of the bucket from pipe 94 causes water at the bottom to be discharged through pipe 104.

When the hoist hook 93 is engaged in the lifting eye 99 and the bucket lifted from the supporting rails 91 in loading tank 90, the cable 98 supports the whole weight of the bucket loaded with fish and water on its bottom door 96, thereby holding the door tightly closed to prevent leakage during the trip on the hoist.

Figures 31, 32 and 33 illustrate the unloading station F at the upper end of the bucket hoist on the high line canal G. A funnel-shaped guide box 110 is equipped with a supporting ledge 111 for the bottom edges of the bucket 92, allowing sufficient clearance for the bottom door 96 to open freely. As soon as the weight of the bucket is transferred from hoist hook 99 to the supporting ledge 111, the weight of water and fish on the bottom door 96 is sufficient to compress the spring 100 and open the door, discharging the fish and water into the canal G, as shown. When the load is discharged, spring 100 recloses the door 96 and the empty bucket is returned to the upper end of the tracks 91 in loading tank 90.

A screen 112 keeps the fish out of a portion of the canal from which water is withdrawn through a pipe 113 to supply the needs of stationary fish ladder B, traveling fish ladder C, and loading tank D. The considerable amount of water thus withdrawn from the canal G produces sufficient current in the canal to cause the fish discharged at the unloading station F immediately to start swimming upstream toward the lake 12. Pipe 113 and the other pipes connected therewith leading to the stationary and traveling fish ladders are equipped with suitable valves to control the water supply for the fish ladders regardless of fluctuations in the forebay level.

In some installations it is feasible to raise the canal G to a level above the dam whereby the fish may be delivered from canal G to the river at some suitable point upstream from the dam. Fish elevator H in the canal G is then not necessary and the canal may be supplied with water by direct gravity flow from the river or by a pump from the lake 12.

In Figure 2 the hoist discharge station J on the downstream face of the dam comprises a channel through the dam which also supplies water to operate the fish ladders. In vertical height this channel through the dam extends from one foot above the high forebay level to several feet below the low water level of the forebay to permit the fish to swim directly from the bucket discharge into the forebay.

Fish elevator

Figures 34 to 40 illustrate a novel fish elevator H for lifting fish from the highline canal G to a level above the forebay 11 for passage through the dam 10.

The upper end of the canal G is equipped with louver chambers 121 having vertical louvers 122 similar to the fish ladder louver chambers and louvers 43 and 44 shown in Figure 8. Water is supplied to these louver chambers by pipes 123 extending through the dam and opening into the forebay 11 at 124. The flow is controlled by valves 125. Immediately at the upstream end of louver chambers 121 are vertical converging fish trap nets 126 having narrow openings 127. Fish attracted to the upper end of the canal G by water flowing through the louvers 122 are funnelled through the openings 127 and congregated in a small pool in the path of the rising buckets 130 of the fish elevator H. As best shown in Figure 35, the buckets 130 discharge the fish into a flume 131 leading through the dam to an inclined chute 132 which drops them into the forebay 11. A transverse ridge 133 in the bottom of the flume 132 maintains a supply of water in the flume at all times, additional water being introduced intermittently by the buckets 130 to assist in carrying the fish over the ridge 133 and down the chute 132. The chute 132 is preferably located close to the shore line at one end of the dam and separated from the rest of the forebay by a vertical net 134 extending upstream parallel with the shore line for some distance, so that the fish discharged from chute 132 cannot enter the forebay 11 close to the dam, where they are apt to return downstream over the spillways.

The buckets 130 are mounted on endless chains 135 on upper and lower sprocket wheels 136 and 137 on a vertical frame 120. A vertical baffle plate 138 between the chains prevents the fish from passing behind the elevator, and additional water may be supplied behind the elevator from a pipe 139 to attract the fish toward the elevator. The lower sprocket wheel 137 is disposed in a well 140 having a vertical front wall 141 rising closely adjacent the lips of the upwardly traveling buckets 130. Thus the fish are prevented from passing through or under the elevator and are scooped up from the fish trap pool by the upwardly traveling buckets 130.

As shown in Figures 36 to 39, each bucket 130 has a rim of screen wire 145 to reduce the amount of water which must be lifted. A vertical door 146 is pivotally mounted at the top of each bucket and normally held in closed position by a plurality of latches 147 on a rotatable latch rod 148. The latches are normally held in latching position by a coiled latch spring 149. On the end of rod 148 is a latch trip lever 150. A trough 151 communicating with the flume 131 extends between the bucket flights, as shown, and is equipped with a tripping bar 152 extending into the path of travel of trip arms 150 on the buckets. When each bucket arrives at unloading position just above the trough 151, its trip arm 150 is depressed by the bar 152 to release the door 146 and discharge the contents of the bucket into the trough 151 leading to flume 131.

A short distance above the unloading position the bucket doors 146 are pressed closed by a roller 153 on an arm 154 mounted on a pivot 155. A weight 156 on the arm presses the roller 153 against the bucket doors with sufficient force to latch them. Vertical flanges 157 on the end walls of the bucket are backed up by short track sections on the framework of the elevator to hold the buckets against lateral movement under the pressure of roller 153 to insure latching of the doors.

In Figure 35, low water level in the forebay is indicated at 11 and high water level is indicated at 11a. Flume 131 may extend for a considerable distance beyond the forebay 11 and into the lake 12 supported on a suitable structure above the high water level 11a.

Fish lift pool

Figures 41 to 44 illustrate a novel fish lift pool which may be used in conjunction with the stationary fish ladder B or the highline canal G or to lift fish over a dam or other obstruction in a river without the use of power operated mechanism. The fish lift pool now to be described is of particular advantage where mechanical means are not available to lift the fish, as in isolated and remote places where there is no power to operate mechanical devices. This arrangement provides a deep pool in which the fish can raise themselves to the level of a flume or canal leading upstream to a point beyond the river obstruction. When used at the end of stationary fish ladder B the fish lift pool would make unnecessary the travelling fish ladder C and hoist E. It is to be understood, however, that the designated upper end of the stationary fish ladder B in Figures 41 and 42 may alternatively comprise the upper end of the highline canal G, in which case the present fish lift pool would merely supplant the mechanical elevator shown in Figure 35.

Between the divergent side walls 160 are a pair of spaced partition walls 162 and 163 as in the fish ladder B, these walls having submerged openings 164 and 165 in their bottom portions. On the upstream side of the wall 162 is a V-shaped arrangement of vertical baffles 166 forming a fish trap having a narrow opening 167, as shown. Large upstream migrating fish can pass through opening 167 but cannot pass between the baffles 166. Water is preferably supplied in sufficient volume to overflow the crests of the walls 162 and 163, as shown, but the flow may be carried at a lower level if desired.

Another higher partition wall 168 equipped with a submerged opening 169 forms the downstream side of a fish lift pool 170. Pool 170 is allowed to overflow through a water level opening 171 into an overflow box 172 directing the pool discharge against the downstream side of the wall 168. Opening 171 is equipped with flash boards 171a. On the upstream side of pool 170 is an arrangement of submerged upcurrent louvers 175, arched over the top of a horizontal louver chamber 176 supplied with water from a pipe 177. Fish entering the submerged opening 169 rise through the pool against the current and, being unable to pass downwardly between the louvers 175, swim over these louvers and rear crest wall 183 into flume 178. Flume 178 is supplied with water from a higher flume 179 having a screened discharge end 180 equipped with a solid cover 180a. Being unable to jump upwardly into flume 179, the fish drop and are swept down into pool 181 which runs into a transverse flume 182 leading to the forebay. Upper flume 179 is supplied with water from pipe 187. Pipe 187 may communicate with the river at some point upstream above the level of the forebay or water from the lake may be pumped into this pipe.

Flume 178 may also be used without the pool 181 and flume 182 to transfer fish upstream without entering the forebay. In such case, flume 178 is supplied with water by a pump or from a higher level of the river by gravity, which water then flows directly into lift pool 170 over the louvers 175. The same upstream source may be utilized to supply water to louver chamber 176 under pressure. With such an arrangement there is no need for the second flume 179 because the water level in lift pool 170 is at the same level as the water entering the pool in flume 178. Salmon passing over louvers 175 can then swim directly upstream in the flume 178, the bottom of which should be two feet or more below the water level in lift pool 170.

The numeral 173 designates a bottom cleanout opening having an adjustable gate which may be opened also for the purpose of discharging bottom fish and water from the fish lift pool.

*Fingerling elevator and de-elevator*

Figures 45 to 49 show an arrangement for conveying fingerlings down over the dam to the lower river level at 13. Small fish migrating downstream through the lake 12 are diverted by the vertical fine mesh lead net on the boom K into the converging fish trap nets L. The nets L lead the fish through a small opening 200 into a confined space where the fish are congregated between a pair of nets 201 extending between the nets L and an elevator H, which is similar to the elevator H in Figure 35 but may be of smaller size. The elevator buckets 130 discharge into a trough 202 leading to a flume 203 passing through or over the dam 10. The fingerling elevator preferably is located at the upper end of the lake 12 and generally can be built in fairly shallow water, but in some cases it may have to extend to a considerable depth. The elevator frame 204 is supported on a structure built of piling or other rigid construction at the desired location. A division plate 201a extends from the water level to the bottom of the elevator to prevent fish from passing through the elevator without entering the buckets 130. Nets 201 and plate 201a form a collecting fish pool whose only entry is at trap opening 200. There is no outlet except by way of the elevator.

The fingerling de-elevator M comprises a series of stages of spiral channels 205 interconnected by straight channels 206. These channels may be supported in a suitable framework 207 on the rear face of the dam or on the wall of the canyon. The various spiral channel stages 205 may be separated horizontally as may be required to fit the structure to the dam face or to the topography, and resting pools 206a may be included between stages if desired. In any event, care is taken to locate the discharge channel or flume 210 of the de-elevator at a suitable point a safe distance downstream in Figure 1 from the turbulent regions 16 and 17 and other hazards to small fish. The migrating fingerlings have no inclination to travel upstream, and will, accordingly, proceed down the river in the normal manner according to instinct, passing freely through the coarse mesh lead net or fence A.

*Fingerling lead nets and trash collection system*

Figures 50 to 56 illustrate various equipment associated with the fingerling lead net boom K in the lake 12 above the dam. The boom K preferably comprises a series of rafts or barges 212 connected end to end in a suitable location as hereinabove described. Where possible, a location should be selected below the first stream above the dam where fish ordinarily spawn and below all tributaries which bring any considerable amount of debris into the lake.

Each raft or barge 212 carries on its downstream side a vertical frame 213 which suspends from its lower edge a deeply submerged fine mesh vertically hanging net 214, preferably long enough to reach the lake bottom 215. Each net 214 is connected with chains or cables 216 by which it may be raised for inspection.

The upper and lower ends of frame 213 carry horizontal shafts 217 equipped with notched and grooved pulleys 218 for cable screens 220. The cables 220 are clamped between grooved bars 221 and angle bars 222 which impart transverse stiffness to the screen. The notches in the pulleys act as sprockets for the bars 221, and the ridges between the notches push out sticks and other debris which may become wedged between the cables. Angle bars 222 form ledges on which peat moss, leaves and small debris can be carried up and over the top pulleys, after which such material will be washed out of the screen on the downstream side. At intermediate points the cables may be supported against the force of any existing current by suitable idler pulleys. The cables are preferably stranded from stainless steel wires which are non-corrodible, flexible and very strong.

On a number of the rafts 212 the shaft 217 is equipped with a sprocket 223 and chain 224 driven by an electric motor 225. On the other rafts the shafts 217 may be driven from a powered shaft by means of suitable couplings 226. The edges of the nets 220 are enclosed within the flanges of channels 227 on the frames 213. The frames 213 are supported on overhanging beams 228 mounted on a portion 229 of the raft structure. By the foregoing arrangement the roller nets 220 may be rotated from time to time or continuously for cleaning as may be required. The lower stationary nets 214 seldom require cleaning.

The nets 214 and 220 are omitted from those rafts 212 which span the entrance to the converging fish trap nets L whereby such entrance is left open for the entrance of the fingerlings seeking to pass downstream. Cables 220 are spaced sufficiently close together to prevent the passage of fingerlings therethrough whereby these fish are diverted into the fish trap nets L.

For convenience, the reference character K in Figures 1 and 2 may be considered to designate the nets 214 and 220 as well as the chain of rafts 212.

Figures 50, 51, 55 and 56 further show power operated mechanism for removing floating trash and litter which normally drifts into the forebay and tends to pile up against the dam and penstock intake towers. In the present arrangement this debris is collected from in front of the fingerling lead nets K and disposed of, whereby it will not wash downstream and have to be contended with at every dam on the river. Heretofore such material has presented a serious problem at every dam because a large part of it washes down the spillways from time to time and collects in great quantities against the intake screens of the powerhouses at all the lower dams.

Conveyor lugs 230 in the form of vertical plates equipped with depending teeth 231 are mounted at intervals on the links of horizontal endless chains 232. The links of chains 232 pass over sprocket wheels 233 on horizontal shafts 234 at the ends of each raft 212. The shafts are motor driven by means of sprocket wheels 235 and the whole conveyor assembly is suspended from suitable hanger brackets 236, with the lowermost lugs or blades 230 at approximately water level. Logs, trees, and other floating debris 237 are engaged by the plates 230 and passed along the upstream side of the boom K from one raft to the next. The upstream side of each raft 212 is equipped with a vertical rub plate or fender 238 extending far enough down into the water to prevent floating debris from passing under the raft.

At the shoreline the debris 237 is picked up by an inclined logging conveyor 240 on the bank which delivers the debris to a hog machine 241. After being reduced to chips, the material is transported by a conveyor 242 to a suitable place of disposal 243 where the material is made available for utilization as fuel, pulp, or for other purposes. Large logs or trees are first cut in suitable lengths for feeding into the hog machine before being introduced to conveyor 240.

*Fish diversion louver fence*

A preferred and novel form of the screen or fence A in Figures 1 and 2 is shown in Figures 57 to 59, comprising a louver fence 250. A concrete foundation 251 on the river bottom supports vertical piers 252 at regular intervals. The piers are slotted at 253 to receive frames 254 comprising vertical angle bars welded at their ends to top and bottom channels 256. Each such assemblage of bars 255 comprises a removable screen which can be lifted out of the slots 253 as a unit when not needed. The screens are buttressed against the force of the river current by I-beams 257 secured at their ends to the piers 252.

The foundation 251, with its line of piers 252, is disposed across the river bed at right angles to the direction of the river current, which is designated by the arrow 260. Arrow 261 indicates the direction to the fish ladder entrance, as shown in Figure 1. The river water leaves the downstream side of the screen at an angle of approximately 45 degrees from the center line of the river and toward the opposite shore from the entrance to the fish ladder. This induces the upstream migrating fish to head along the lower side of the screen or fence toward the fish ladder as they face the direction of the current. It is understood that in Figure 2 the angle bars 255 are turned in the opposite direction to deflect the current 260 toward the left and induce the fish to swim to the right as they approach the downstream side of the fence.

The vertical angle bars 255 are spaced apart a sufficient distance to permit fingerlings and other small fish to pass through freely. The openings are relatively wide for the passage of water, leaves and other light debris, but the spacing of the bars is close enough to prevent adult fish passing through. Large fish can start to enter the openings between the bars, but cannot make the right angle turn necessary to pass through the screen. The exact dimensions and spacing of the bars are determined by the types of fish which the screen is intended to pass and the types which it is intended to exclude in a particular river.

Having now described my invention and in what manner the same may be used, what I claim as new and desire to protect by Letters Patent is:

1. A system for assisting the upstream migration of fish past an obstruction in a river comprising a louver screen in said river below said obstruction for deflecting the upstream movement of said fish toward one end of said screen, a stationary fish ladder extending inland from the river bank at said one end of said screen, a power operated traveling fish ladder extending in continuation of said stationary fish ladder, a bucket hoist receiving fish from said traveling fish ladder and raising said fish to an elevation above the water level upstream from said obstruction, and an unloading station for said bucket hoist arranged to deliver said fish to said upstream water level, said stationary and travelling fish ladders extending only a minor portion of the distance to said upstream water level and said bucket hoist traversing the major portion of said distance.

2. A system for assisting the upstream migration of fish past an obstruction in a river comprising a louver screen arranged in the river downstream from said obstruction to deflect the upstream movement of the fish toward one end of said screen, a stationary fish ladder at said one end of said screen, a power operated traveling fish ladder forming an extension of said stationary fish ladder, a bucket hoist, a loading tank for said bucket hoist, means for conveying fish from said traveling fish ladder to said loading tank, an unloading station for said bucket hoist, and a canal extending upstream from said unloading station, said stationary and travelling fish ladders extending only a minor portion of the distance to said canal and said bucket hoist traversing the major portion of said distance.

3. A system for assisting the upstream movement of migratory fish past an obstruction in a river comprising a lead screen arranged downstream from said obstruction to deflect the fish toward one end of the screen, a stationary fish ladder at said one end of said lead screen, a traveling fish ladder extending in continuation of said stationary fish ladder, a bucket hoist, a loading tank for said bucket hoist, means for conveying fish from said traveling fish ladder to said loading tank, an unloading station for said hoist, a canal extending from said unloading station upstream to said obstruction, means for lifting fish from said canal to a predetermined water level of the river on the upstream side of said obstruction, and a channel for conveying said fish from said lift means to the river on the upstream side of said obstruction.

4. In a fish ladder installation on a river of variable water level, deflecting means defining louver openings in opposite side walls of said fish ladder at its entrance below the low water level of said river, louver chambers behind said louver openings, pipes equipped with valves for supplying water to said louver chambers, deflecting means defining louver openings in the opposite side walls of said ladder at a point above low water level and below high water level of said river, louver chambers behind said louver openings, and pipes equipped with valves for supplying water to said last louver chambers, said deflecting means being turned to deflect said water through said louver openings in a downstream direction in the fishway channel of the ladder.

5. In a fish ladder, a fish lift chamber having a submerged outlet forming a fish entrance at the bottom of one side of said chamber communicating with the upper end of said fish ladder, an overflow opening on said one side of said chamber above said submerged outlet discharging into said upper end of the fish ladder for establishing a pool level in said chamber, submerged upcurrent louvers at the opposite side of said chamber slightly below said pool level, a louver chamber beneath said louvers, means for supplying a flow of water to said louver chamber to produce an upcurrent through said louvers, a flume above the pool level in said chamber arranged to discharge a water fall on top of said upcurrent louvers, and a fish landing pool on the opposite side of said louvers from said chamber.

6. In a fish ladder, a louver chamber, upcurrent louvers on top of said chamber, a fish lift pool at one side of said louver chamber submerging said louvers, a fish landing pool on the oppoite side of said louver chamber, a flume above said pools arranged to discharge a water fall on said upcurrent louvers to supply said landing pool and said fish lift chamber, and means for supplying a flow of water to said louver chamber to produce an upcurrent through said louvers.

7. A traveling fish ladder comprising a well, a series of buckets pivotally connected together in an endless chain, sprocket wheels supporting an upper flight of said endless chain of buckets in an inclined position in said well, end walls on said buckets forming side walls of a water channel on said upper flight, a fishway communicating with the lower end of said channel, and water supply means for said channel.

8. A traveling fish ladder comprising a well, a series of buckets pivotally connected together in an endless chain, sprocket wheels supporting an upper flight of said endless chain of buckets in an inclined position in said well, end walls on said buckets forming side walls of a water channel on said upper flight, a fishway communicating with the lower end of said channel, water supply means for said channel, doors on the bottoms of said buckets, a transverse trough extending beneath said upper flight of buckets, and means for opening said doors to discharge the contents of said buckets into said trough.

9. In a fishway, a traveling fish ladder comprising an endless chain of moving buckets having an inclined upper flight of buckets, overlapping end walls on said buckets forming side walls of a water channel on said upper flight, doors on the bottoms of said buckets, a transverse trough extending beneath said upper flight of buckets for receiving the contents of said buckets, a hoist loading tank, parallel inclined tracks in said tank, and a series of wheeled hoist buckets adapted to move by gravity on said tracks to a loading position under the discharge end of said trough.

References Cited in the file of this patent

UNITED STATES PATENTS

| | | |
|---|---|---|
| 492,879 | Stoner | Mar. 7, 1893 |
| 530,655 | Richardson | Dec. 11, 1894 |
| 809,316 | Mackin | Jan. 9, 1906 |
| 1,146,911 | Wilkerson | July 20, 1915 |
| 1,292,794 | Johnson | Jan. 28, 1919 |
| 1,423,424 | Holliday | July 18, 1922 |
| 1,432,076 | Mellin | Oct. 17, 1922 |
| 1,494,076 | Provay | May 13, 1924 |
| 1,564,451 | Schroeder | Dec. 8, 1925 |
| 1,573,785 | Albright | Feb. 16, 1926 |
| 1,579,105 | Green | Mar. 30, 1926 |
| 1,621,170 | Landau | Mar. 15, 1927 |
| 1,630,169 | Coleman | May 24, 1927 |
| 1,967,050 | Bracket | July 17, 1934 |
| 2,168,341 | Holmes et al. | Aug. 8, 1939 |
| 2,169,249 | Holmes et al. | Aug. 15, 1939 |
| 2,171,560 | Holmes et al. | Sept. 5, 1939 |
| 2,667,036 | Davis | Jan. 26, 1954 |
| 2,683,969 | Mugnier | July 20, 1954 |
| 2,826,897 | Vinsonhaler et al. | Mar. 18, 1958 |
| 2,860,488 | Johnson | Nov. 18, 1958 |

FOREIGN PATENTS

| | | |
|---|---|---|
| 568,472 | France | Dec. 22, 1923 |